Figure 8:
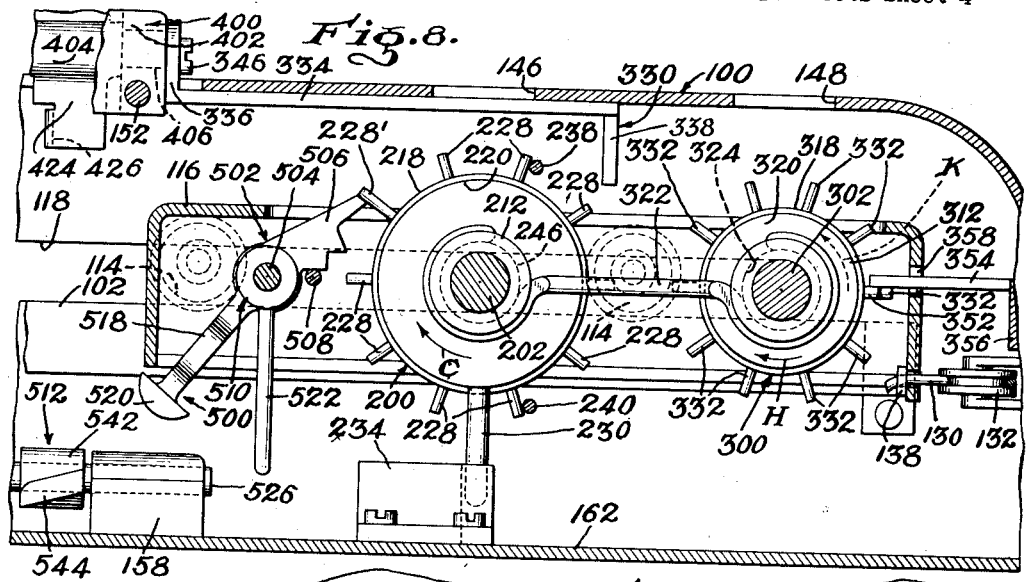

Oct. 2, 1951  F. A. DEUTSCH  2,569,804
CALCULATING MACHINE
Filed Nov. 30, 1946  14 Sheets-Sheet 1
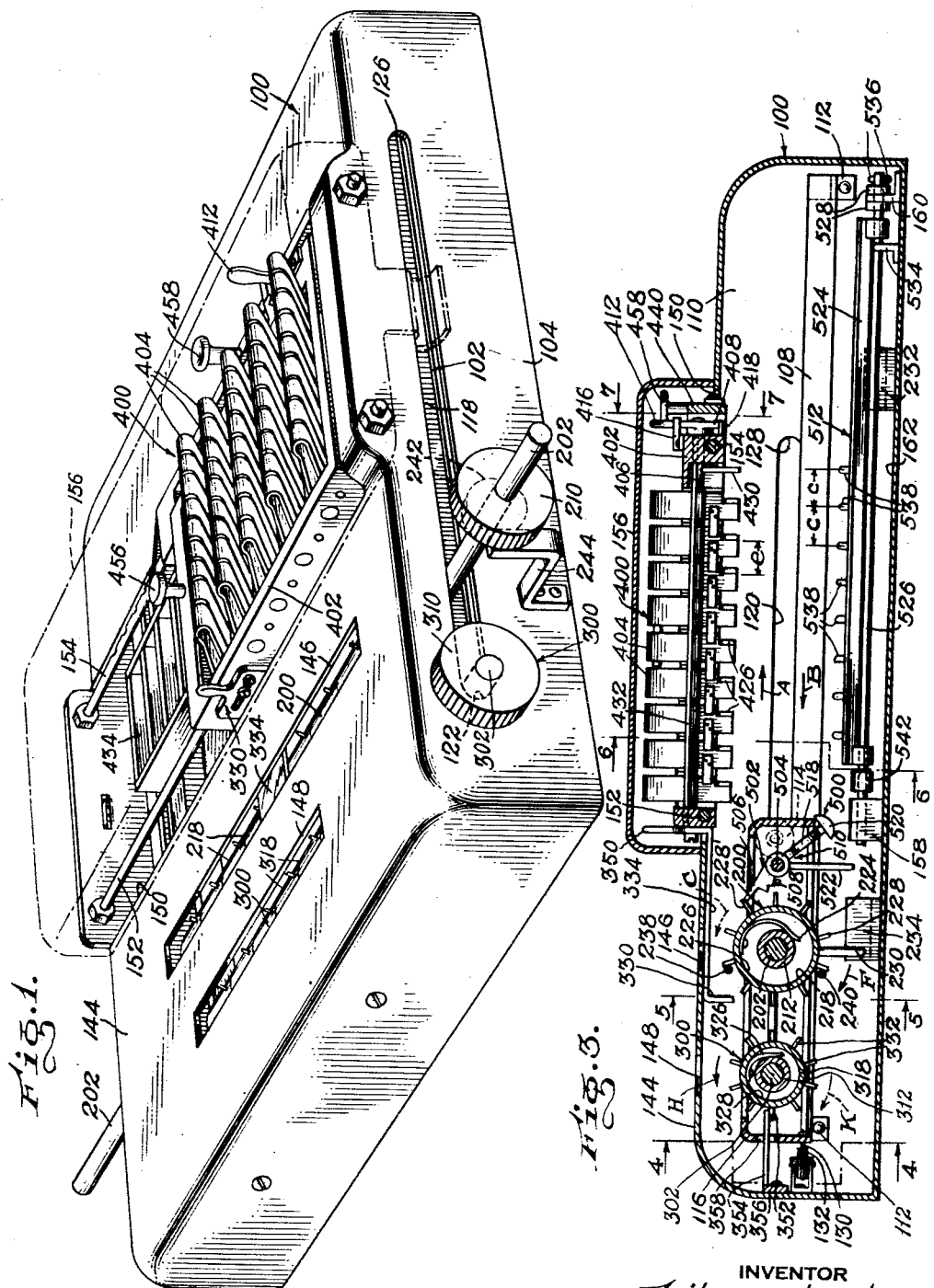
INVENTOR
Fritz Albert Deutsch
BY 
ATTORNEY

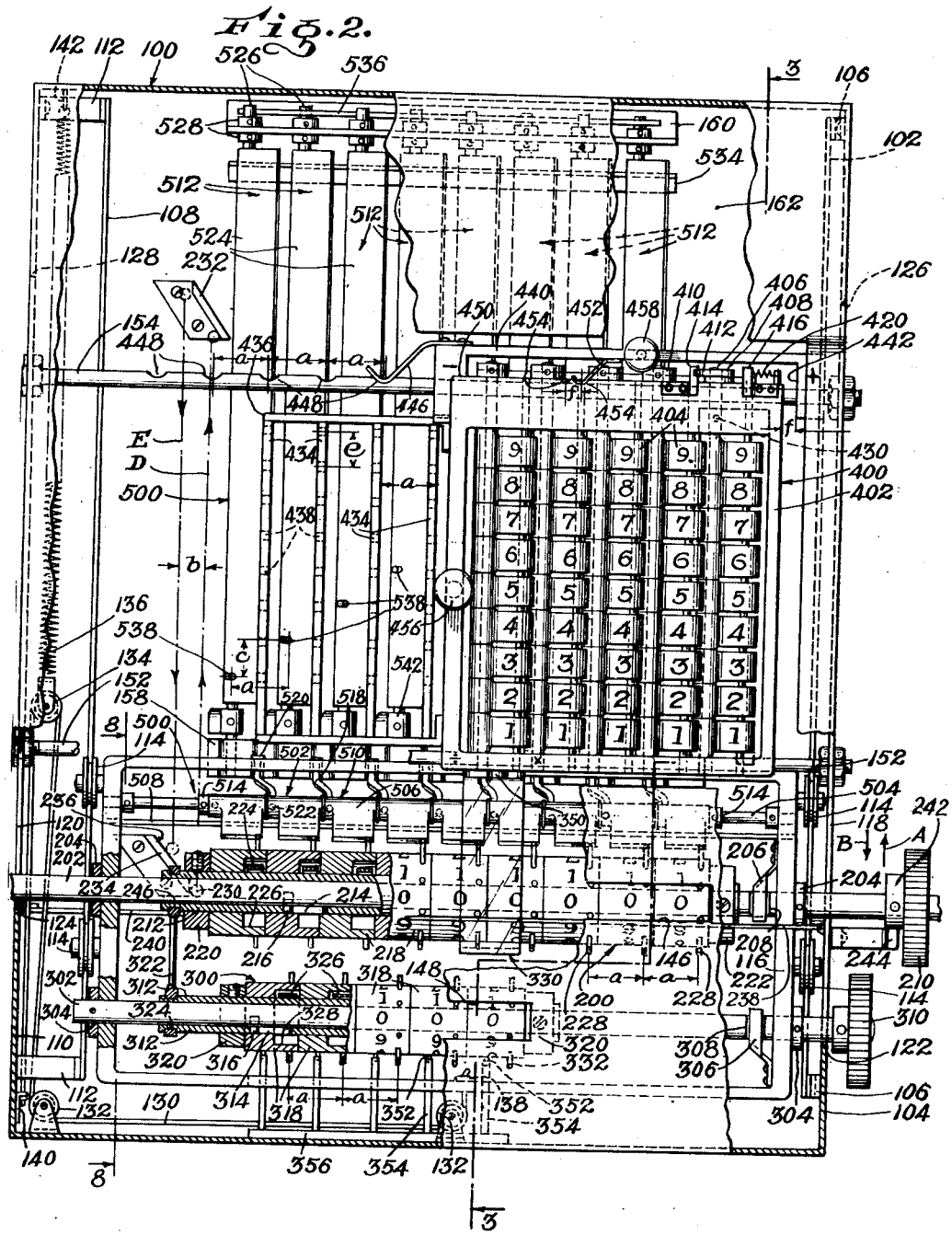

Oct. 2, 1951
F. A. DEUTSCH
2,569,804
CALCULATING MACHINE
Filed Nov. 30, 1946
14 Sheets-Sheet 3
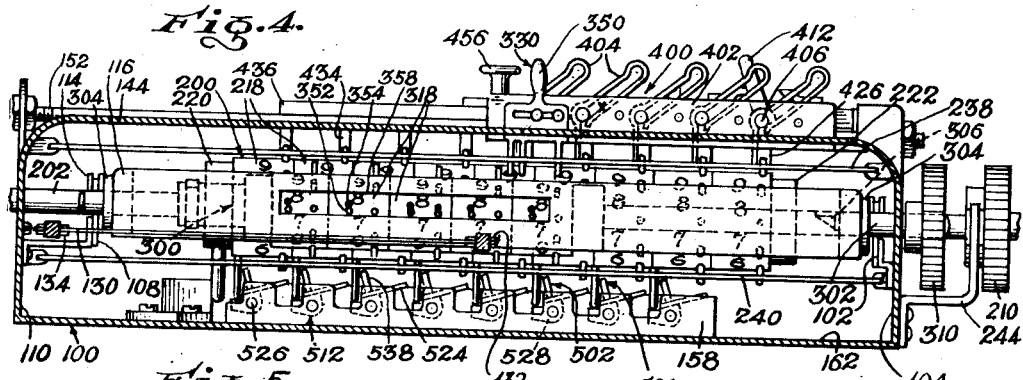
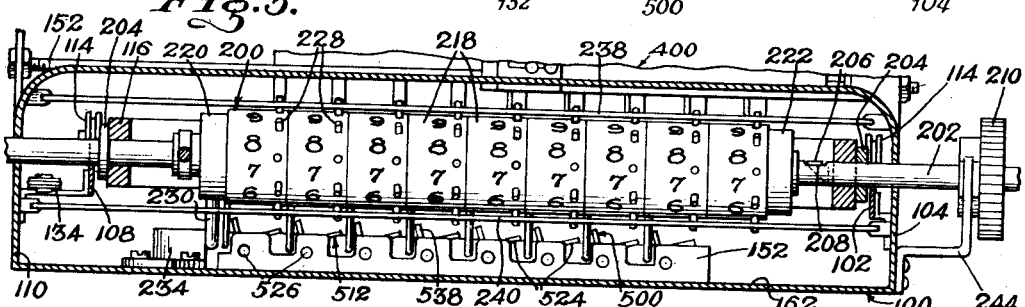
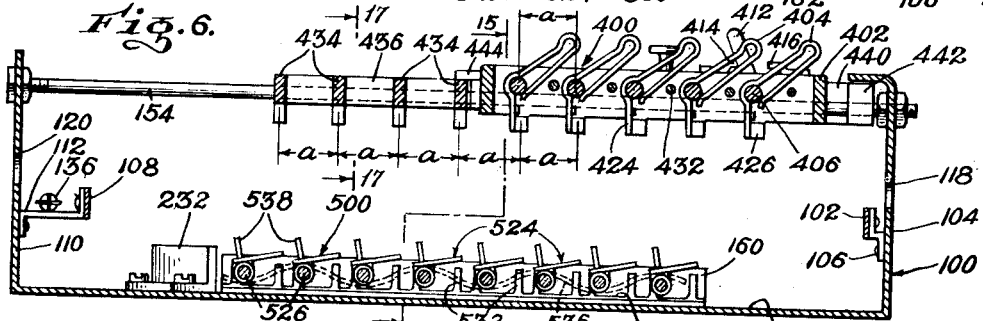
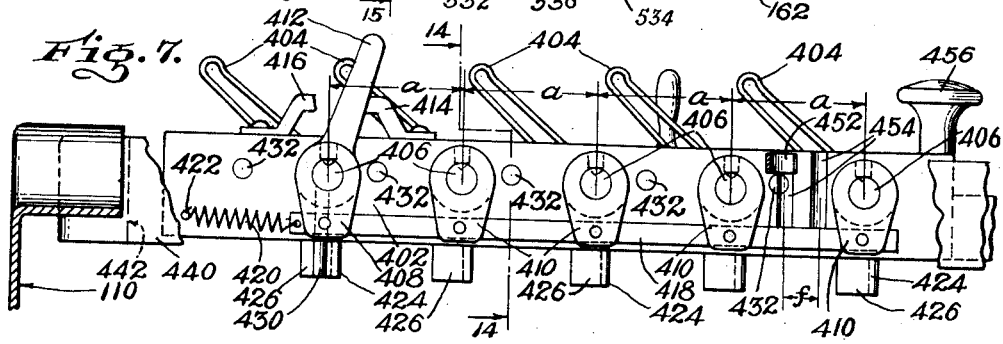
INVENTOR
*Fritz Albert Deutsch*
BY
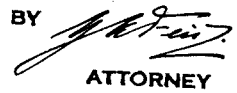
ATTORNEY Oct. 2, 1951     F. A. DEUTSCH     2,569,804
CALCULATING MACHINE
Filed Nov. 30, 1946     14 Sheets-Sheet 4

INVENTOR
Fritz Albert Deutsch
BY
ATTORNEY

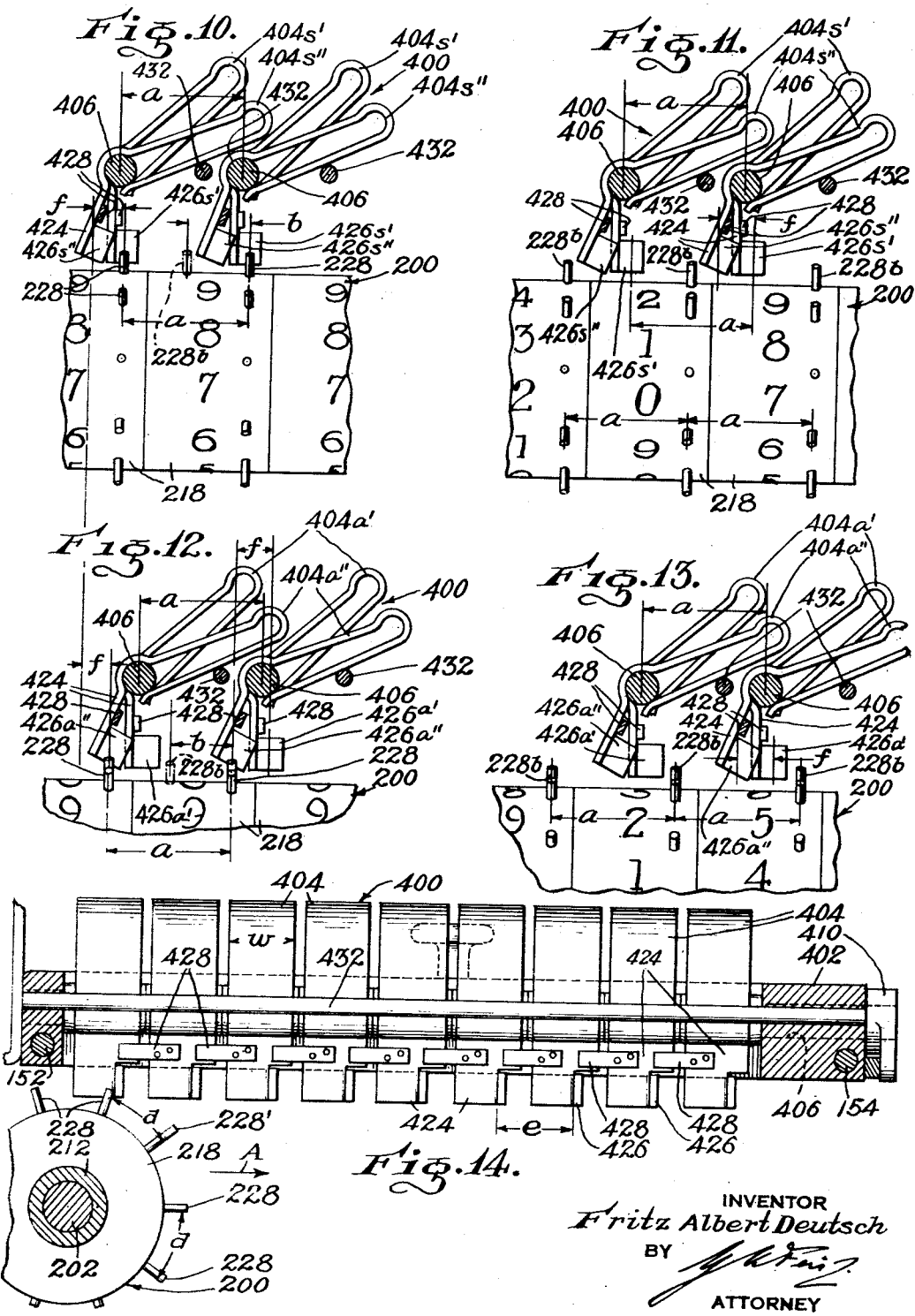

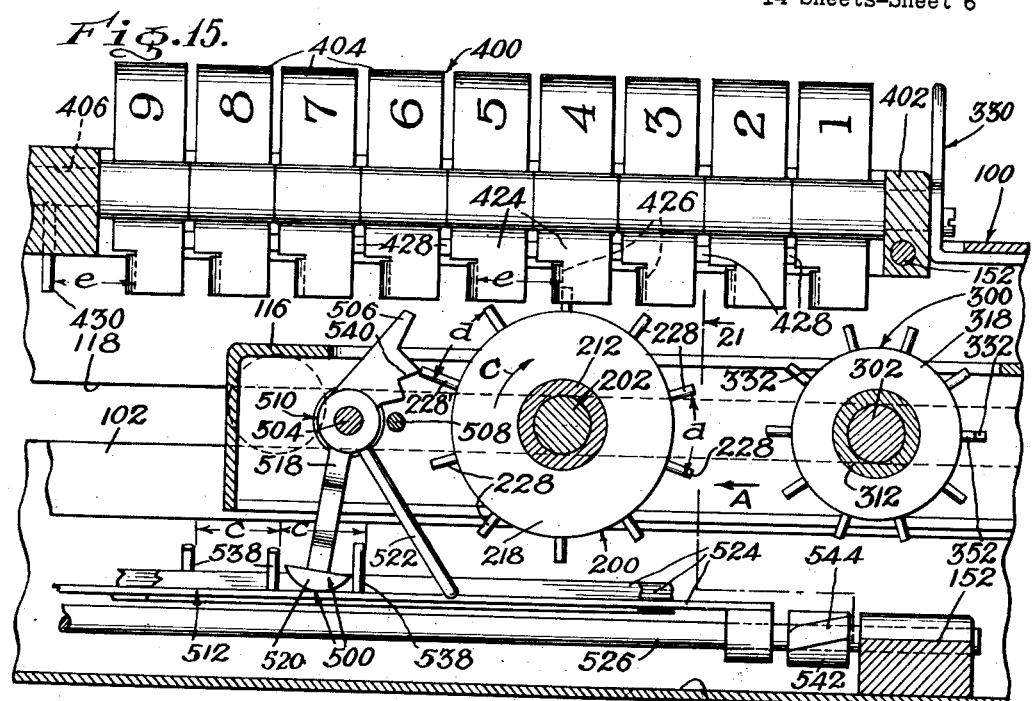
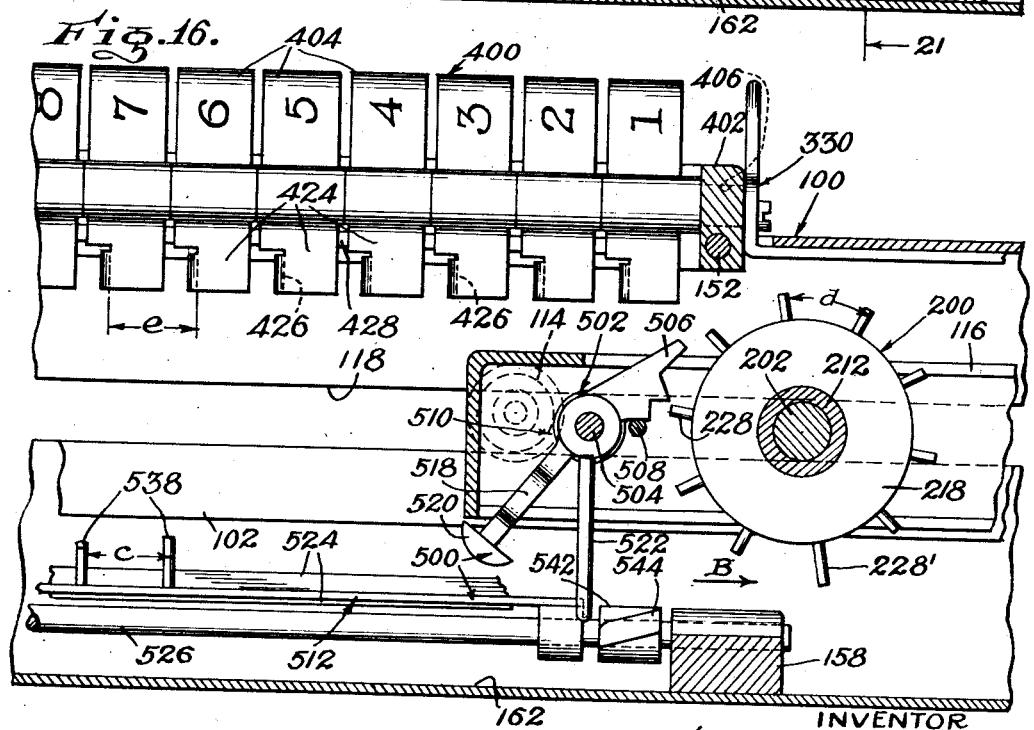

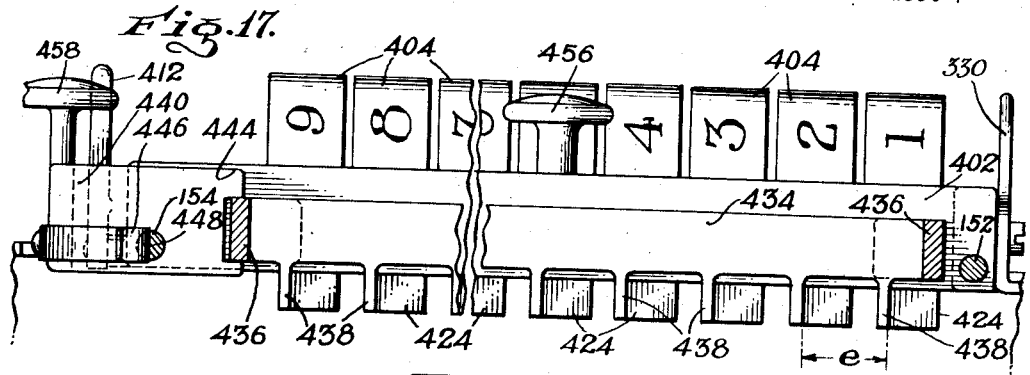
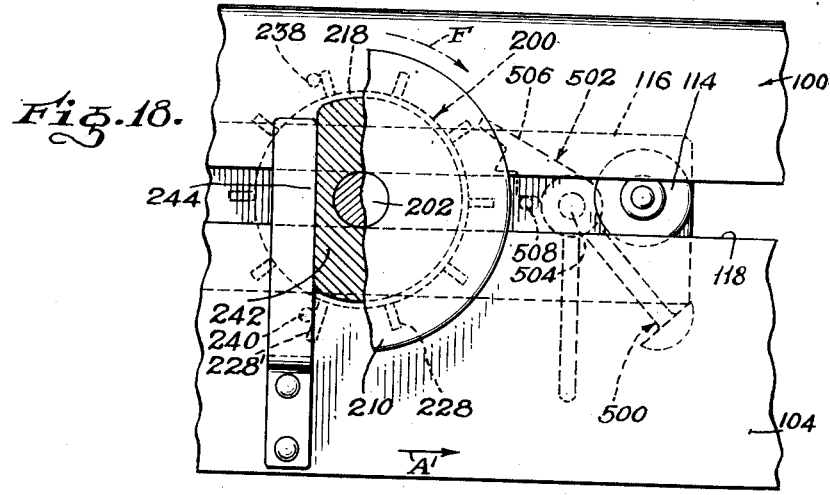
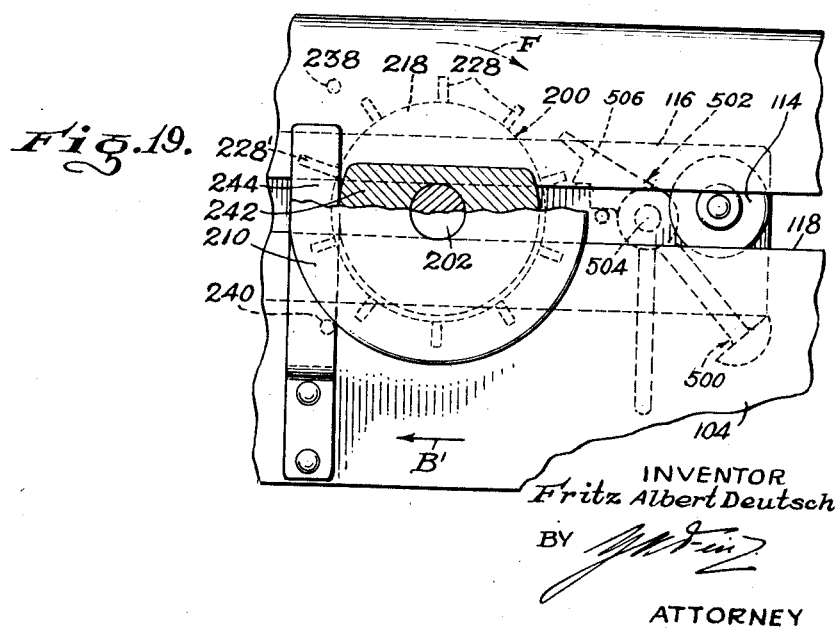

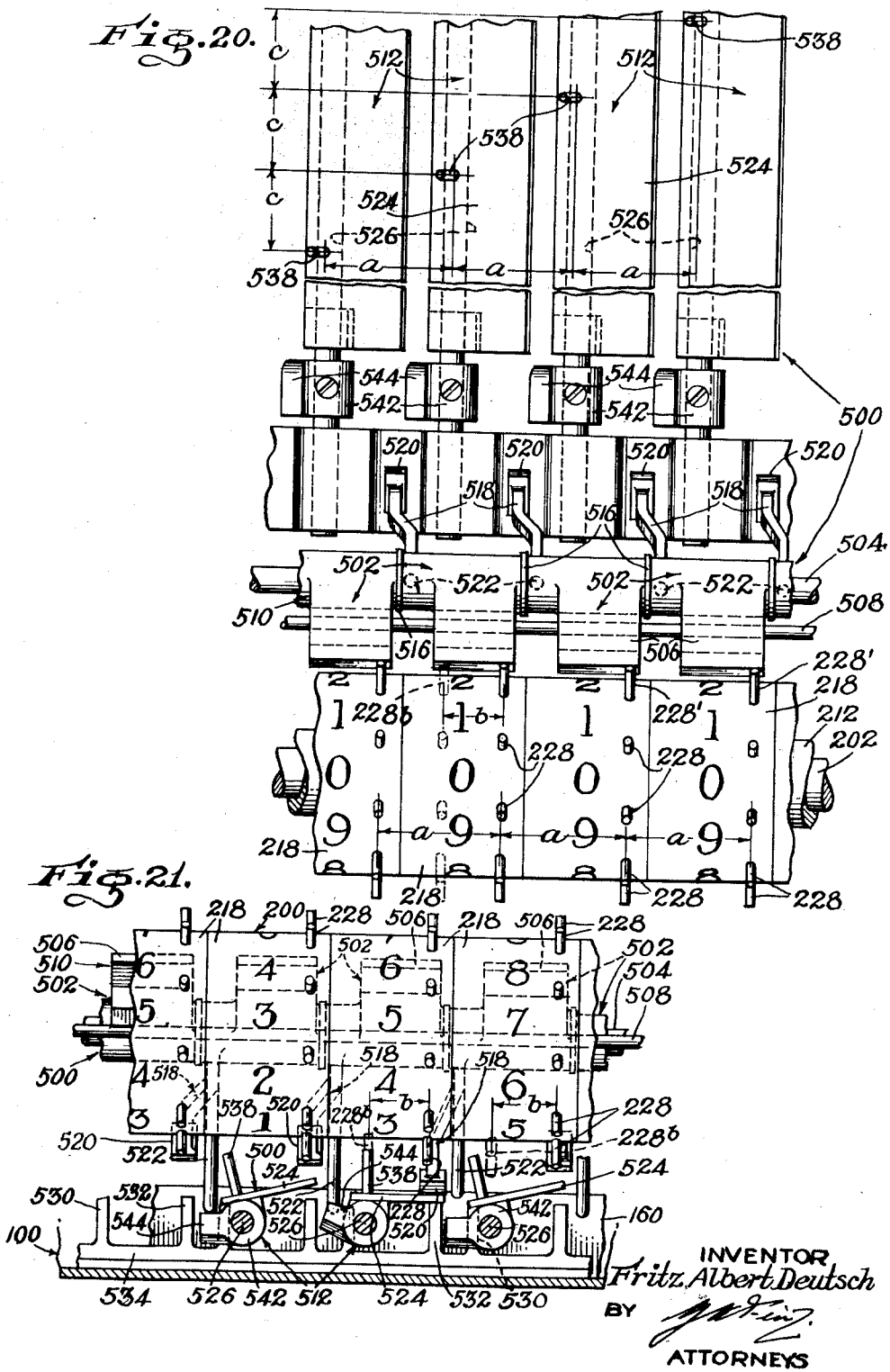

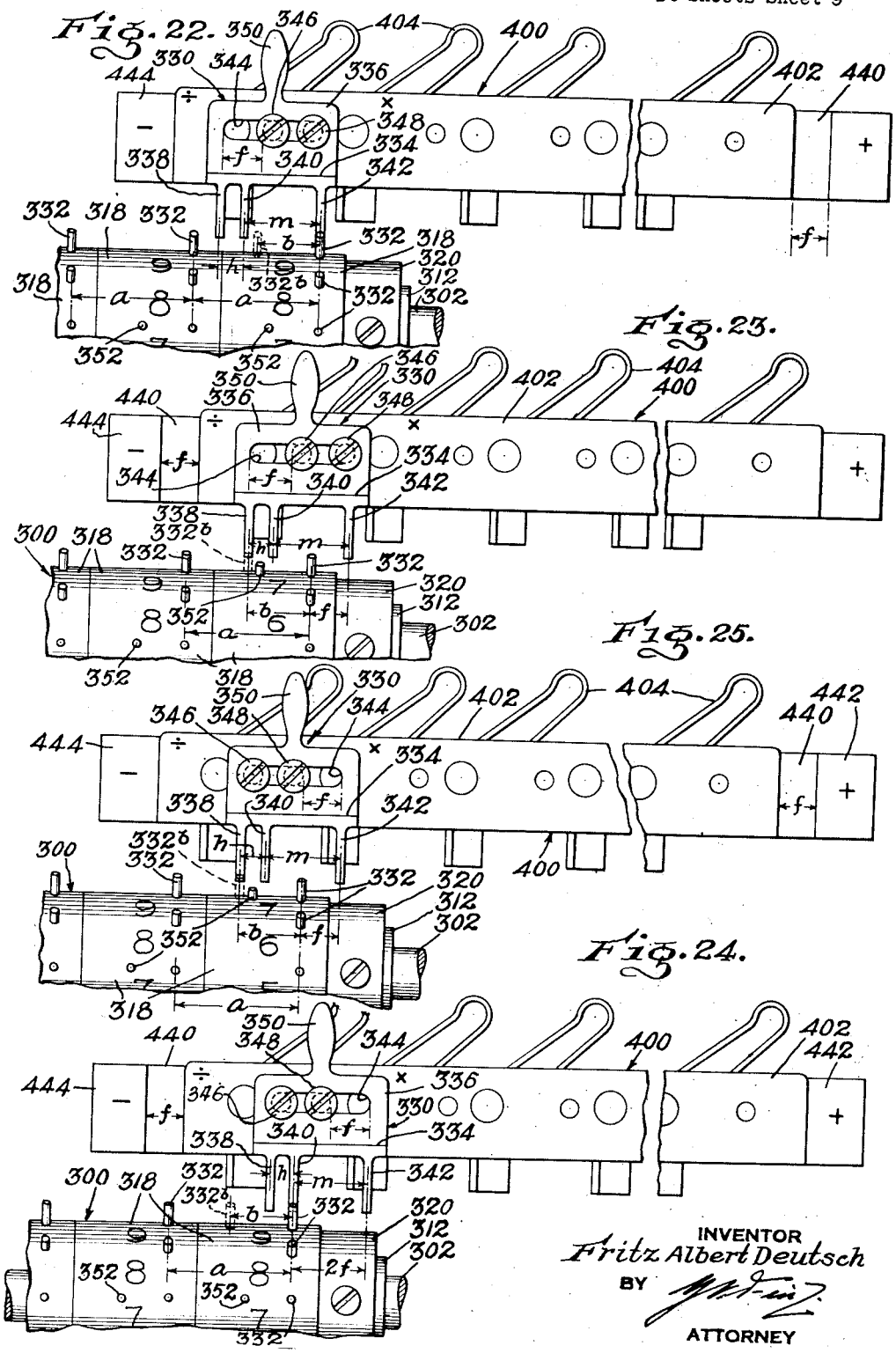

Oct. 2, 1951   F. A. DEUTSCH   2,569,804
CALCULATING MACHINE
Filed Nov. 30, 1946   14 Sheets-Sheet 10
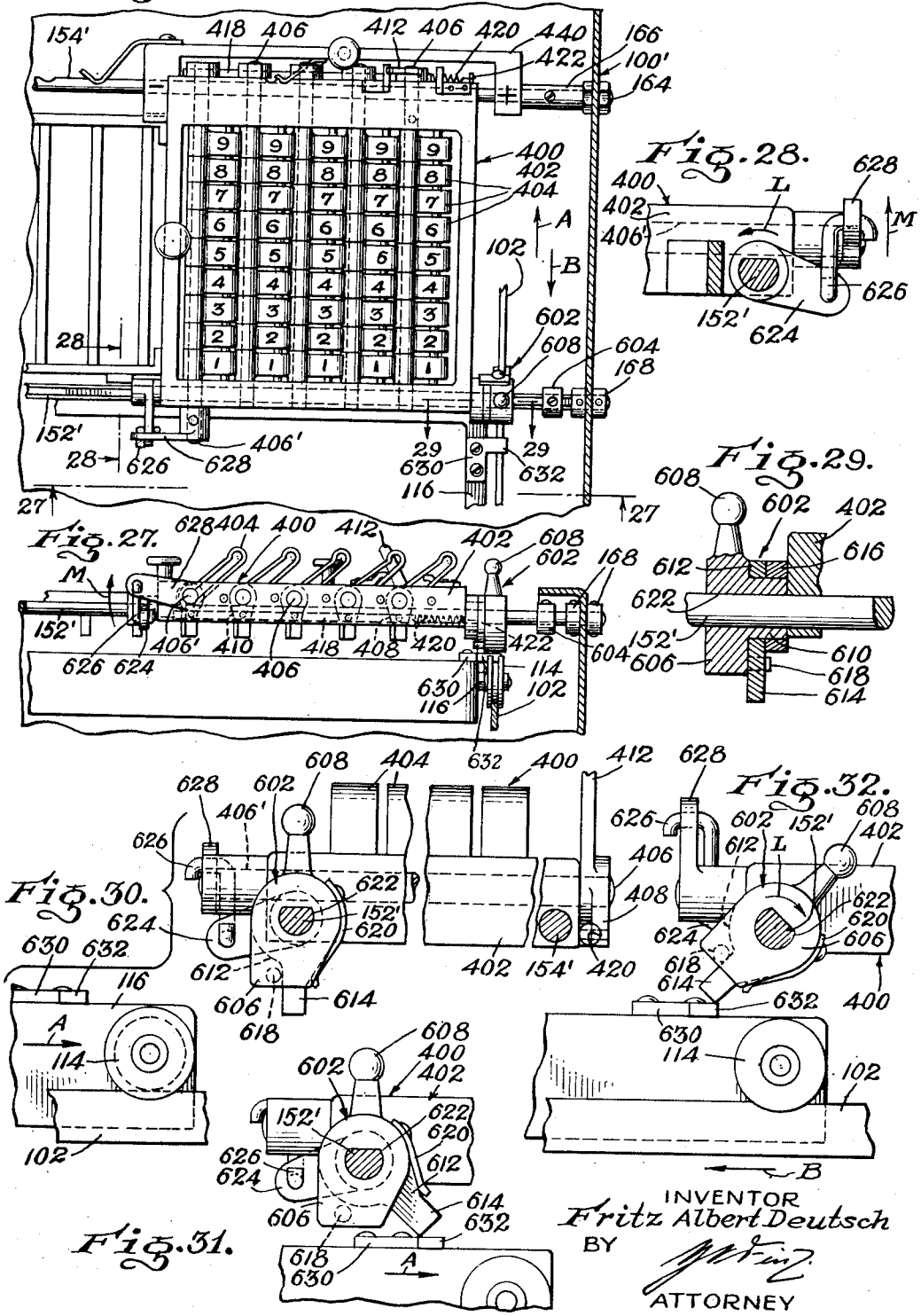
INVENTOR
Fritz Albert Deutsch
BY
ATTORNEY

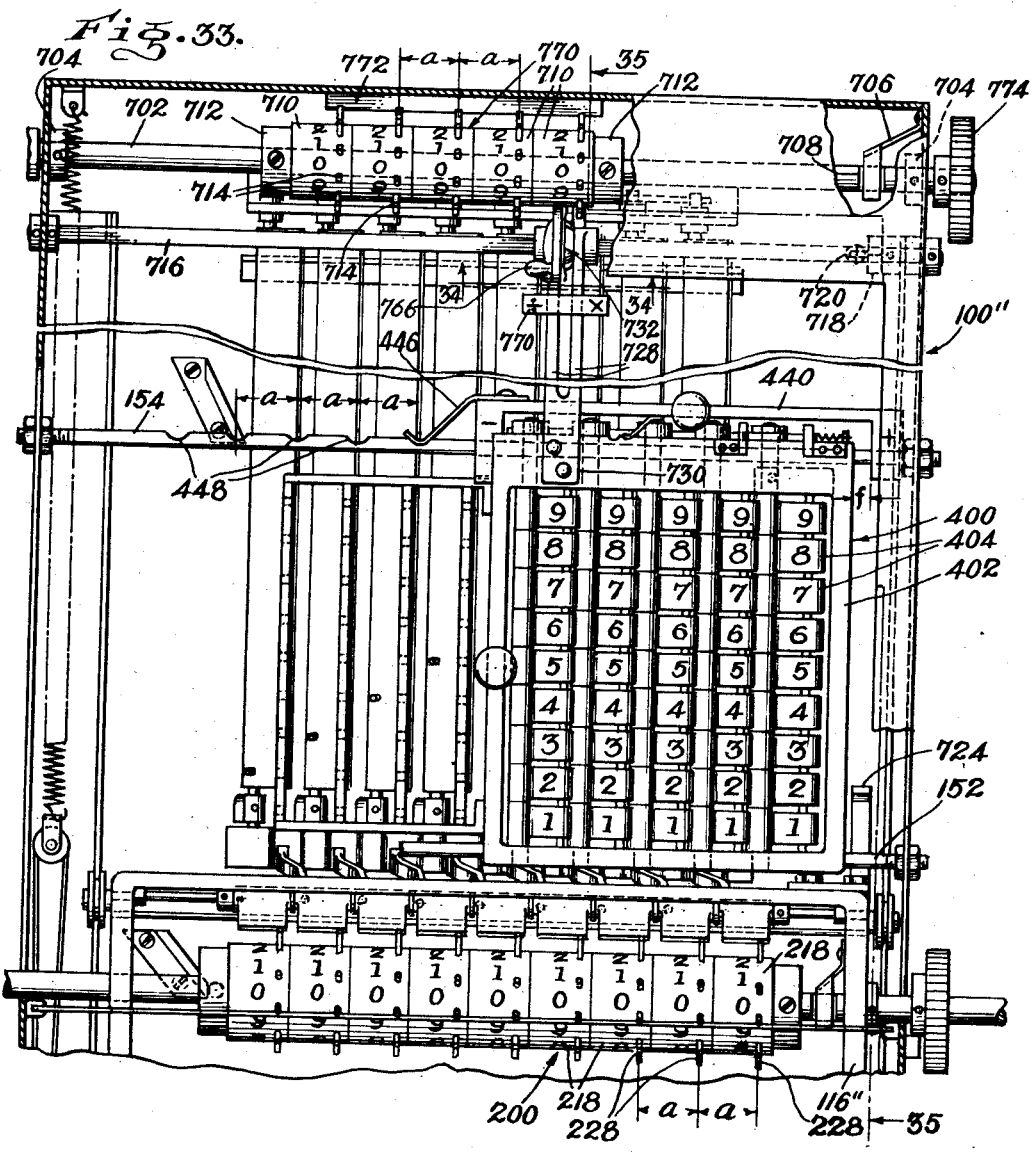

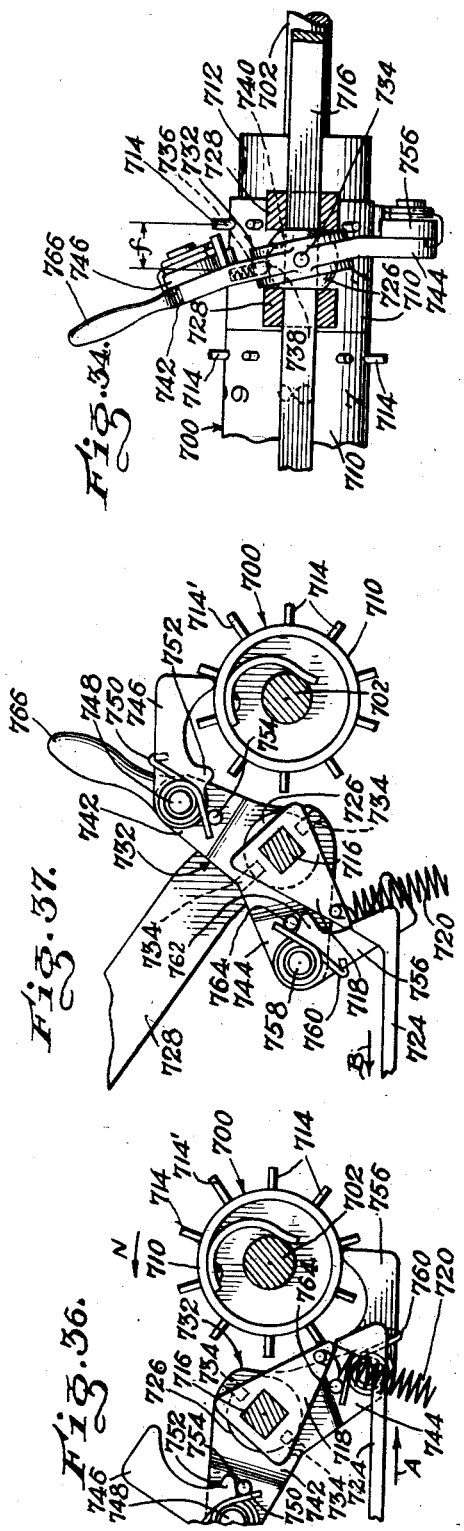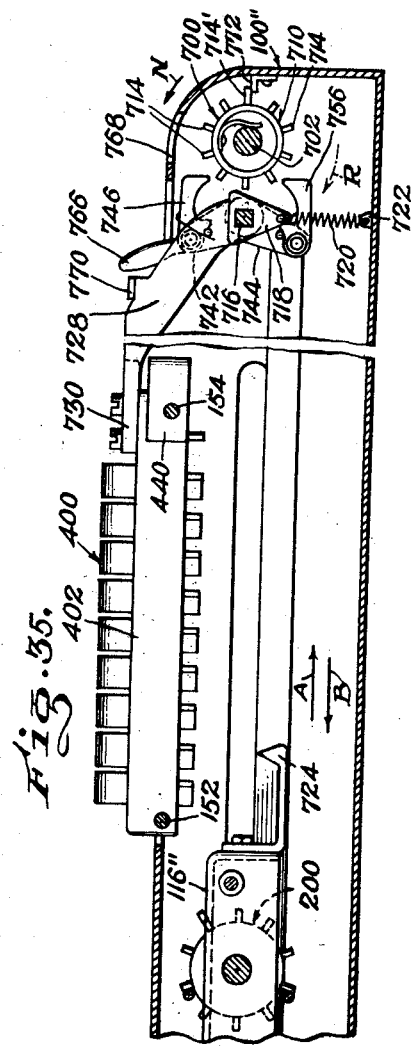

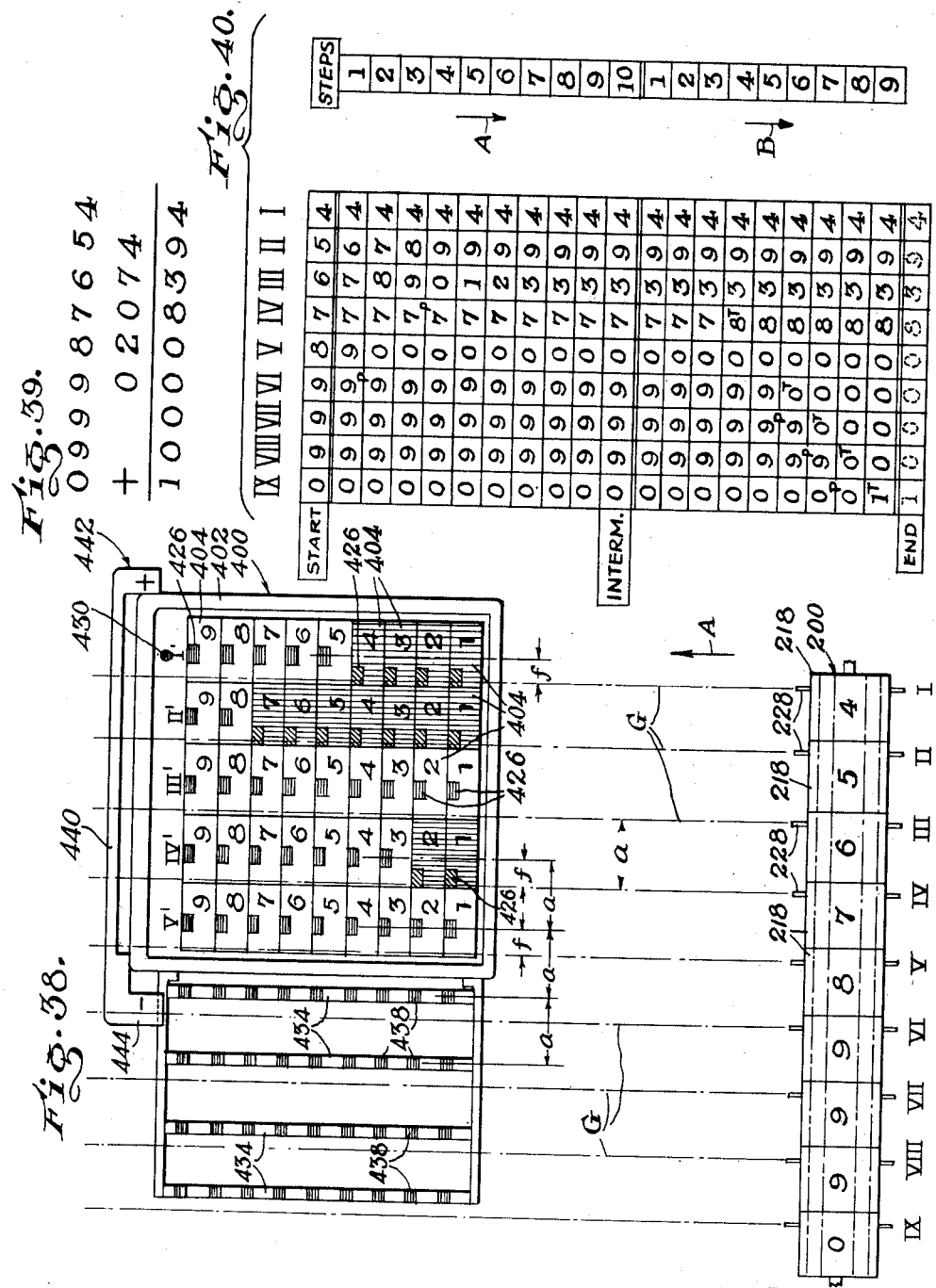
Oct. 2, 1951    F. A. DEUTSCH    2,569,804
CALCULATING MACHINE
Filed Nov. 30, 1946    14 Sheets-Sheet 13
INVENTOR
*Fritz Albert Deutsch*
BY 
ATTORNEY Oct. 2, 1951  F. A. DEUTSCH  2,569,804
CALCULATING MACHINE
Filed Nov. 30, 1946
14 Sheets-Sheet 14

INVENTOR
Fritz Albert Deutsch
BY
ATTORNEY

Patented Oct. 2, 1951

2,569,804

UNITED STATES PATENT OFFICE 2,569,804

CALCULATING MACHINE

Fritz Albert Deutsch, Caracas, Venezuela

Application November 30, 1946, Serial No. 713,317

25 Claims. (Cl. 235—79)

This invention relates to a calculating machine.

An object of the invention is to provide a calculating machine of such a compact construction, that it may be readily carried in a coat pocket.

Another object of this invention is to provide a calculating machine with such a type of a setting mechanism, that, during the setting of a digital value in the keyboard, the operator may depress simultaneously several adjacent keys of an order of the keyboard without causing a misoperation of the calculating machine, so that, in other words, the keys of each order of the keyboard may be arranged directly adjacent each other and the top surface of each key of the various orders of the keyboard may have an area considerably smaller than the tip of a finger, whereby the overall dimension of the keyboard and consequently of the entire calculating machine is reduced to a minimum.

A further object of this invention is to provide a calculating machine with such a type of a setting mechanism that the depressing of a key of the keyboard causes simultaneously the setting of a digital value and of the complement thereof.

Still another object of this invention is to provide a calculating machine, wherein a digital value set in the keyboard may be directly entered from the keyboard into the register.

A further object of this invention is to provide a calculating machine, wherein the mechanisms for the performance of mathematical operations are of such a construction and arrangement, that the dimensions of the calculating machine may be made of such small size, that they fit the size of a coat pocket.

Figure 9:
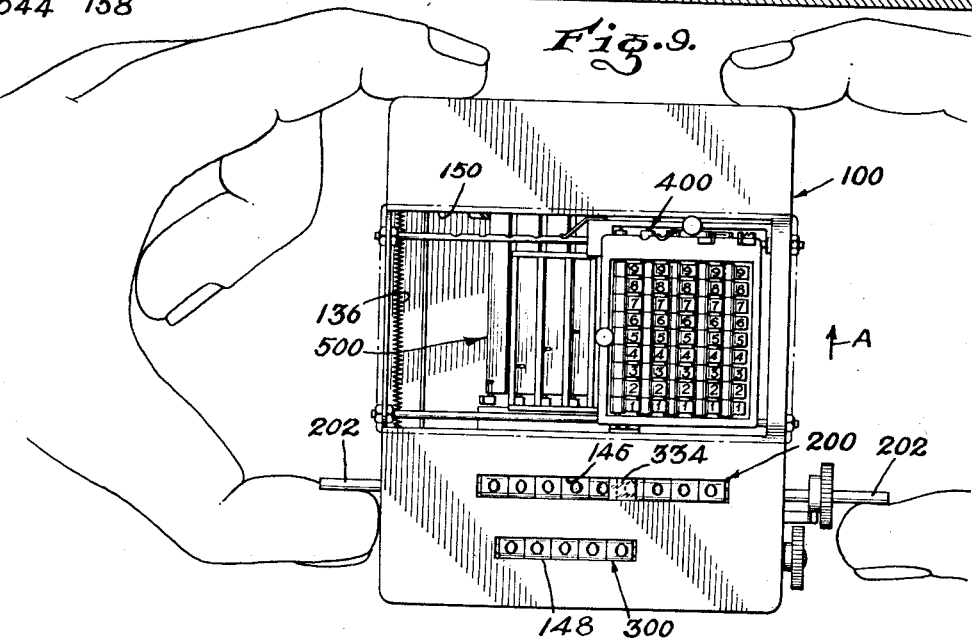

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

Fig. 1 is a perspective view of a calculating machine according to the invention, Fig. 2 is a top view of the calculating machine, some parts being broken away and some parts being shown in section, Fig. 3 is a sectional view of the calculating machine, taken on line 3—3 of Fig. 2, Fig. 4 is a sectional view of the calculating machine, taken on line 4—4 of Fig. 3, Fig. 5 is a sectional view of the calculating machine, taken on line 5—5 of Fig. 3, Fig. 6 is a sectional view of the calculating machine, taken on line 6—6 of Fig. 3, Fig. 7 is a fragmentary sectional view taken on line 7—7 of Fig. 3, said sectional view illustrating the setting mechanism of the calculating machine in an enlarged scale, Fig. 8 is a fragmentary sectional view taken on line 8—8 of Fig. 2, said sectional view illustrating the carriage comprising the register and the counter of the calculating machine, Fig. 9 is a top plan view of the calculating machine illustrating a way of operating same, Fig. 10 is a fragmentary view of a portion of the register and of a portion of the setting mechanism illustrating the cooperation of the register wheels with the setting mechanism during a forward stroke of the register when the calculating machine is set for subtraction, Fig. 11 is a fragmentary view similar to that shown in Fig. 10, wherein, however, the register wheels are in a different position relative to the setting mechanism during the return stroke thereof, Fig. 12 is a fragmentary view of a portion of the register and of a portion of the setting mechanism illustrating the cooperation of the register wheels with the setting mechanism during a forward stroke of the register when the calculating machine is set for addition, Fig. 13 is a fragmentary view similar to that shown in Fig. 12, wherein, however, the register wheels are in a different position relative to the setting mechanism during the return stroke thereof, Fig. 14 is a sectional view of the setting mechanism of the calculating machine, taken on line 14—14 of Fig. 7, Fig. 15 is a fragmentary sectional view of the calculating machine taken on line 15—15 of Fig. 6, Fig. 16 is a fragmentary sectional view of the calculating machine similar to that shown in Fig. 15 wherein, however, the register is in a different position, Fig. 17 is a fragmentary sectional view of the calculating machine, taken on line 17—17 of Fig. 6, Fig. 18 is a fragmentary side elevational view of the calculating machine illustrating the clearing mechanism of the register, some parts being broken away, Fig. 19 is a fragmentary side elevational view similar to that shown in Fig. 18, wherein, however, the register is in a different position, Fig. 20 is a fragmentary top plan view illustrating the tens carry mechanism, Fig. 21 is a fragmentary sectional view, taken on line 21—21 of Fig. 15, illustrating details of the tens carry mechanism, Fig. 22 is a fragmentary view of a portion of the counter and of its adjustable actuating mechanism illustrating the cooperation of the counter wheels with said actuating mechanism, when the calculating machine is set for division and for subtraction, Fig. 23 is a fragmentary view similar to that shown in Fig. 22, wherein, however, the actuating mechanism of the counter is in a different position relative to the counter wheels, when the calculating machine is set for division and for addition, Fig. 24 is a fragmentary view similar to that shown in Fig. 22, wherein, however, the actuating mechanism of the counter is in a different position relative to the counter wheels, when the calculating machine is set for multiplication and addition, Fig. 25 is a fragmentary view similar to that shown in Fig. 22, wherein, however, the actuating mechanism of the counter is in a different position relative to the counter wheels, when the calculating machine is set for multiplication and subtraction, Fig. 26 is a fragmentary top plan view, some parts broken away and some parts shown in section, of a calculating machine according to the invention equipped with an automatic clearing mechanism of the setting mechanism, Fig. 27 is a fragmentary sectional view taken on line 27—27 of Fig. 26, Fig. 28 is a fragmentary sectional view taken on line 28—28 of Fig. 26, Fig. 29 is a fragmentary sectional view taken on line 29—29 of Fig. 26, Fig. 30 is a fragmentary elevational view illustrating the cooperation of the register carriage with the automatic clearing mechanism of the setting mechanism, Fig. 31 is a fragmentary elevational view similar to that shown in Fig. 30, wherein, however, the register carriage is in a different position, Fig. 32 is a fragmentary elevational view similar to that shown in Fig. 30, wherein, however, the register carriage is in still another position, Fig. 33 is a fragmentary top plan view, some parts broken away and some parts shown in section, of another embodiment of a calculating machine according to the invention, which is equipped with a different type of an actuating mechanism for the counter, Fig. 34 is a fragmentary sectional view taken on line 34—34 of Fig. 33, Fig. 35 is a fragmentary sectional view of the calculating machine shown in Fig. 33, taken on line 35—35 of said Fig. 33, Fig. 36 is a fragmentary sectional view similar to that shown in Fig. 35, wherein, however, the elements of the actuating mechanism are in a different position, Fig. 37 is a fragmentary sectional view similar to that shown in Fig. 36, wherein, however, the elements of the actuating mechanism are in a different position, Fig. 38 is a somewhat diagrammatical illustration for explanation of the operation of the calculating machine shown in Figs. 1–3 when set for addition, Fig. 39 represents a problem of addition, Fig. 40 represents tabular illustrations for explanation of the changes in the positions of the register wheels during the performance of an adding operation for an answer to the problem of addition represented by Fig. 39, Fig. 41 is a somewhat diagrammatical illustration for explanation of the operation of the calculating machine shown in Figs. 1–3 when set for subtraction, Fig. 42 represents a problem of subtraction, and Fig. 43 represents taubular illustrations for explanation of the changes in the position of the register wheels during the performance of a subtracting operation for an answer to the problem of subtraction represented by Fig. 42.

HEADINGS

1. General Organization of the Caculating Machine.
2. The Register.
3. The Mechanism for Clearing the Register.
4. The Tens Carry Mechanism.
5. The Mechanism for an Automatic Clearing of the Tens Carry Mechanism.
6. The Setting Mechanism.
7. The Mechanism for Clearing the Setting Mechanism.
8. The Mechanism for Adjusting the Calculating Machine for Addition and Subtraction.
9. The Place-Shifting Mechanism.
10. The Counter.
11. The Mechanism for Actuating the Counter.
12. The Mechanism for Clearing the Counter.
13. The Operation of the Calculating Machine.
14. The Modification of a Mechanism for an Automatic Clearing of the Setting Mechanism.
15. A Modified Mechnaism for Actuating a Counter.
16. Summary.

1. GENERAL ORGANIZATION OF THE CALCULATING MACHINE

As best shown in Figs. 1–6 and 9, the calculating machine comprises a casing generally indicated by 100. A first rail 102 is secured to the side wall 104 of the casing 100 by means of brackets 106, and a second rail 108 is secured to the side wall 110 by means of brackets 112.

The wheels 114 of a carriage 116 carrying the register generally indicated by 200 and the counter generally indicated by 300 are engaged with said rails 102, 108, so that said carriage may be reciprocated in the direction of the arrows A and B (see Figs. 2 and 3). The ends of a shaft 202 of the register 200 pass through slots 118 and 120 of the side walls 104 and 110. One end of a shaft 302 of the counter 300 passes also through the slot 118. The first extreme position or starting and end position of the carriage 116 is limited by an abutment of the counter shaft 302 against the end 122 of the slot 118 and of the register shaft 202 against the end 124 of the slot 120 as shown in Fig. 2; the second extreme position or intermediate position of said carriage 116 is limited by an abutment of the register shaft 202 against the ends 126 and 128 of the slots 118 and 120.

One end of a cord 130 trained around rollers 132 mounted on the casing 100 of the calculating machine and around a roller 134 arranged at the end of a tension spring 136 is connected with the carriage 116 at 138; the other end of said cord 130 is connected with the casing 100 at 140. Said tension spring 136 is connected with the casing 100 at 142. Thus, the tension spring 136 tends to retract said carriage 116 with the register 200 and counter 300 into the starting or end position shown in Fig. 2.

The top surface 144 of the casing 100 has a window 146 for reading off the numerical values appearing in the register 200. Furthermore, said top surface 144 of the casing 100 has a window 148 for reading off the numerical values appearing in the counter 300.

Moreover, the top surface 144 of the casing 100 of the calculating machine is provided with an aperture 150 receiving the setting mechanism generally indicated by 400, which is slidably arranged for crosswise displacement on transverse bars 152 and 154 rigidly secured to the side walls 104 and 110 of the casing 100. Said aperture 150 may be closed by a removable cover 156 when the calculating machine is not used.

A tens carry mechanism generally indicated by 500 comprises means 510 for preparing a tens transfer, which are mounted on the reciprocable carriage 116, and means 512 for performing a tens transfer, which are mounted on brackets 158 and 160 secured to the bottom 162 of the casing 100 of the calculating machine.

2. THE REGISTER

As best shown in Fig. 2, the shaft 202 of the register 200 is rotatably arranged in the carriage 116 reciprocably mounted on the rails 102, 108 of the casing 100. The shaft 202 is prevented from an axial displacement by means of set collars 204 secured thereto. A spring 206 secured to the frame of the carriage 116 and arranged for engagement with a recess 208 of the shaft 202 tends to hold said shaft normally in the position shown in Figs. 2 and 5; said spring 206, however, does not prevent the shaft 202 from rotation, when the latter is manually rotated by means of a knurled resetting knob 210 secured to the end of the shaft for a clearing of the register 200 in a manner to be described hereinafter.

According to Fig. 2 a sleeve 212 having a slot 214 engaged with a pin 216 secured to the register shaft 202 is slidably mounted on the latter for displacement in the direction of its longitudinal axis. Owing to above mentioned pin-slot-connection 216, 214, the sleeve 212 cannot be rotated relative to the register shaft 202 but will participate in any rotation of said register shaft.

The sleeve 212 coupled with the register shaft 202 in above described manner and normally held in the position shown in Fig. 2 by means of the spring 206 cooperating with the recess 208 of the register shaft carries a plurality of register wheels 218; there are 9 register wheels 218 in the embodiment of a calculating machine shown in the drawings whereby a nine-order-register is formed.

Said register wheels 218 are prevented from an axial displacement relative to the sleeve 212 by means of set collars 220, 222 secured to said sleeve at the ends thereof. On the other hand, said set collars 220, 222 cause an axial displacement of the set of register wheels 218 together with the sleeve 212 when the latter is axially displaced in a manner to be described hereinafter.

Each register wheel 218 is frictionally coupled with said sleeve 212 by means of a spring 224 arranged within a cylindrical recess 226 of the register wheel (see Figs. 2 and 3); one end of such a spring 224 is secured to a wall of such a recess 226, the other end of such a spring 224 is resiliently engaged with the surface of the sleeve 212. Thus, each register wheel 218 may be rotated relative to the sleeve 212 by means of the setting mechanism 400 or tens carry mechanism 500 in a manner to be described hereinafter; when the sleeve 212 is held in its position by means of the spring 206 acting on the register shaft 202, the spring 224 of the register wheel 218 then sliding along the surface of the sleeve 212 and causing a slight braking action on the register wheel. On the other hand, each register wheel 218 may be manually rotated simultaneously with the sleeve 212 through the medium of the spring 224, when said sleeve 212 is rotated by means of the resetting knob 210, unless or until such register wheel is prevented from rotation by a certain blocking mechanism to be described hereinafter, whereupon the sleeve 212 may be rotated relative to the thus blocked register wheel, the surface of the sleeve 212 then sliding along the contacting surface of the spring 224.

Each register wheel 218 is provided on its circumference with 10 equally spaced register pins 228, 228' (see, for example, Figs. 2, 3 and 8), which, during a forward movement of the register 200 in the direction of the arrow A (see Figs. 2 and 3) by a manual gripping of the projecting ends of the register shaft 202 as indicated in Fig. 9, may come in engagement with certain elements of the setting mechanism 400 as will be described hereinafter, and which, during a return movement of the register 200 in the direction of the arrow B (see Figs. 2 and 3) by the retracting action of the tension spring 136, may come in engagement with a certain element of the transfer performing means 512 of the tens carry mechanism 500 as will be described hereinafter. Each time when such an engagement takes place during the forward stroke and/or return stroke of the register 200, the respective register wheel 218 will be operatively rotated one step through an angle equal to $\frac{1}{10}$ of a revolution in the direction of the arrow C (see Figs. 3, 8 and 15).

Furthermore, each register wheel 218 is provided with 10 numerals 0, 1, 2, 3 . . . 9 on its circumference, said numerals being arranged in an ascending sequence with respect to above mentioned operative rotation of the register wheels in the direction of the arrow C. Each of said numerals is placed in a space between two register pins as shown in Figs. 2, 5, 20 and 21.

The register wheels 218 are of equal diameter and width. Furthermore, the sets of 10 register pins 228, 228' on each of the various register wheels 218 of the 9 orders of the multi-register 200 are spaced from each other at equal distances $a$ (see Figs. 2, 10–13 and 20).

As indicated above and as will be described later on in detail during the forward stroke of the register 200 in the direction of the arrow A (see Fig. 2) the register pins 228, 228' shall be moved in such a path, that they may come in engagement with certain elements of the setting mechanism 400, and during the return stroke of the register 200 in the direction of the arrow B the register pins 228, 228' shall be moved in such a path, that they may come in engagement with certain elements of the transfer performing means 512 of the tens carry mechanism 500. As upon each such engagement during the forward or return stroke the respective register wheel shall be rotated one step in the same direction as indicated by the arrow C, said two paths cannot be identical and, consequently, the register 200 must be displaced sidewise shortly before the end of the forward stroke and shortly before the end of the return stroke. This feature is accomplished in the following manner:

As best shown in Figs. 2, 3, 5 and 8, the left-hand set collar 220 of the register 200 is provided with a downwardly extending arm 230 capable of cooperation with the cam 232 secured to the bottom 162 of the casing 100, when the register approaches the end of its forward stroke, and capable of cooperation with the cam 234 likewise secured to the bottom of the casing, when the register approaches the end of its return stroke. During the forward stroke of the register 200, the arm 230 is moved in the plane indicated by the line D (see Fig. 2), until it comes into engagement with the cam 232, whereupon it is displaced sidewise through the distance b into the plane indicated by the line E. As will be readily understood, said sidewise displacement of the arm 230 mounted on the set collar 220 causes a displacement of each set of register pins 228, 228' through the same distance b into the position 228b, 228'b as shown in dash lines in Figs. 10, 12, 20 and 21. During the subsequent return stroke of the register 200 for the completion of a calculation, the arm 230 mounted on the set collar 220 travels along the plane indicated by the line E in Fig. 2 and, likewise, the register pins 228, 228' of each register wheel 218 return in a plane displaced through the distance b from the plane of their forward stroke, until the arm 230 comes into engagement with the cam 234, whereupon the arm 230 and, of course, the register pins 228, 228' are returned through the distance b into their original plane. As may be recognized from Fig. 2, the return movement of the register 200 continues through a short distance after the arm 230 has been returned by the active surface 236 of the cam 234 through the distance b from the plane E into the plane D, so that, when the register 200 reaches its very end position shown in Fig. 2, the arm 230 is adjacent the cam 234 and disengaged from said active surface 236, so that the arm 230 may be freely rotated during the clearing of the register to be described hereinafter.

As best shown in Figs. 3, 4, 5, 8, 18 and 19 wires 238 and 240 are stretched across the casing 100 for engagement with register pins 228, 228' of the register wheels 218 where the register 200 is in its starting or end position, whereby the register wheels 218 are held in their position. Furthermore, said wires 238, 240 serve to bring the register pins 228, 228' of all register wheels 218 in alignment with each other, when, at the end of a return stroke after the performance of a calculation, one or the other of the register wheels 218 should be thrown off its accurate position relative to the register shaft 202 through a certain angle.

3. THE MECHANISM FOR CLEARING THE REGISTER

As best shown in Figs. 3, 18, 19 and 20, nine register pins 228 of the set of ten register pins of each register wheel 218 are of the same length, while the tenth register pin 228', i. e. the register pin between the numerals 1 and 2, is slightly longer than the other register pins. (For the sake of better illustration, said difference in length is exaggerated in the drawings; likewise the individual length and thickness of each register pin is somewhat exaggerated in the drawings.) A series of 9 tens carry preparing elements or transfer preparers 502 pertaining to the tens transfer preparing means 510 of the tens carry mechanism 500 to be described hereinafter are swingably and axially immovably mounted on a cross-bar 504 secured to the frame of the carriage 116 in front of the series of 9 register wheels 218. As may be gathered from Figs. 2 and 20, one transfer preparer 502 is associated with each order register wheel 218. As best shown in Figs. 3, 17 and 18, each transfer preparer 502 is provided with an upwardly extending lug 506 normally resting by the action of the weight of the transfer preparer 502 or by the action of a spring (not shown) on an abutting rod 508 extending between the side frames of the carriage 116. The short register pins 228 of each register wheel 218 are short enough, that they may pass said lug 506 without actuating same or being blocked by same, when the register wheels 218 are rotated. The long register pin 228', however, is of such a length, that said lug 506 is in its path, when the register wheels 218 are rotated.

As mentioned above, the register shaft 202 and the sleeve 212 coupled with the former may be rotated by means of the resetting knob 210. As the best shown in Figs. 2, 18 and 19, said resetting knob 210 is provided with a cam 242 cooperating with an abutment 244 rigidly secured to the side wall 104 of the casing 100. The cam 242 urged against the abutment 244 by the spring 136 acting on the carriage 116 is in the position shown in Fig. 18 when the register 200 is in its end position prior to a clearing or zeroizing of the register. As soon as the resetting knob 210 is turned somewhat in the direction of the arrow F opposite to the direction of the arrow C (see Fig. 3) indicating the operative rotation of the register wheels 218, the carriage 116 with the register 200 will be displaced to a small degree in the direction of the arrow A' (see Fig. 18), until it reaches the position shown in Fig. 19. During said displacement the register pins 228, 228' clear the wires 238 and 240, so that the register wheels 218 may be rotated in the direction of the arrow F by a rotation of the resetting knob 210. Insofar, as the register wheels 218 are in such a position that the numeral 0 appears in the register window 146 (see Fig. 3) prior to the zeroizing operation, the long register pin 228' abuts against the lug 506 of the associated transfer preparer 502, whereby the register wheel is blocked, so that the rotation of the register shaft 202 and sleeve 212 by the resetting knob 210 remains without influence on such a register wheel frictionally coupled with said sleeve 212. Insofar, as the register wheels 218 are in such a position that a numeral other than 0 appears in the register window, for example in the position shown in Fig. 18, the register wheel will participate in the rotation of the register shaft 202 and sleeve 212 by the resetting knob 210, until the long register pin 228' abuts against the lug 506 of the associated transfer preparer 502, whereupon the register wheel is arrested in its 0-position. Shortly before the end of one revolution of the resetting knob 210, the cam 242 permits a return of the carriage 116 in the direction of the arrow B' (see Fig. 19) by the action of the spring 136 (see Fig. 2), until, at the end of said one revolution, the carriage 116 with the register 200 reaches the position shown in Fig. 2. Now the register is cleared or zeroized, i. e. only the numerals 0 appear in the register window 146 as shown in Fig. 9.

4. THE TENS CARRY MECHANISM

As mentioned above and as shown in Figs. 2–5, 8, 15, 16, 20 and 21, the tens carry mechanism 500 comprises the means 500 arranged on the reciprocable carriage 116 for preparing a tens transfer during a stroke of said carriage and the means 512 mounted on the bottom of the casing 100 for performing a tens transfer during the return stroke of said carriage.

According to Fig. 2, the set of 9 tens carry preparing elements or transfer preparer 502 of the transfer preparing means 510 swingably mounted on the cross-bar 504 of the carriage 116 are held in their proper position relative to the associated register wheels 218 by means of set collars 514 secured to the cross-bar 504. The transfer preparers 502 are separated from each other by washers 516 as best shown in Fig. 20, so that they may be rocked about the bar 504 independently from each other. As mentioned above, each transfer preparer is provided with an upwardly extending lug 506 normally resting on the abutting rod 508. As best shown in Fig. 20 the width of said lug 506 is larger than the distance $b$ of the axial displacement of the register 200, so that during the forward and return stroke of the register 200 the lug of each transfer preparer 506 remains in the path of the long register pin 228' of the associated register wheel 218 when the latter is rotated. Furthermore, as may be gathered from Fig. 2, each transfer preparer 506 except the one associated with the register wheel 218 of the highest order is provided with an inclined downward and sidewise extending actuating arm 518 having a rounded lug 520 shown in Figs. 2, 3, 8, 15, 16 and 21 for a purpose to be described hereinafter. Moreover, as may also be gathered from Fig. 2, each transfer preparer 506 except the one associated with the register wheel 218 of the lowest or units order is provided with a downward resetting arm 522 shown in Figs. 2, 3, 8, 15, 16 and 21 for a purpose to be described hereinafter.

As best shown in Figs. 2 and 4–6, the means 512 for performing a tens transfer comprises 8 parallel transfer bars or transfer performers 524 secured to shafts 526 rotatably arranged in the brackets 158 and 160 mounted on the bottom of the casing 100. Set collars 528 secured to the shafts 526 prevent the transfer bars 524 from axial displacement. Each transfer bar 524 is rockable from a tilted inactive position shown in Figs. 2–6 into a horizontal active position as shown for the center transfer bar 524 of Fig. 21, and vice versa. The tilted inactive position and the horizontal active position are limited by suitable stops 530 and 532 arranged on a member 534 secured to the bottom of the casing 100 (see Figs. 2, 3, 6 and 21). The transfer bars 524 are held in such an inactive or active position by means of a spring 536 wound in a zig-zag line around and along the shafts 526 as shown in Figs. 2, 3 and 6. Each transfer bar 524 is provided with a transfer pin 538. As no tens transfer occurs in the first or units order, no transfer bar 524 is associated with the register wheel 218 of the first order. The 8 transfer bars 524 are arranged in such a manner, that each of them is associated with one of the register wheels 218 of the second to highest order. When a transfer bar 524 is in a tilted inactive position (for example see the right hand transfer bar 524 of Fig. 21), its transfer pin 538 is out of the path of the register pins of the associated register wheel 218, whether said register pins are in the position 228 during the forward stroke of the register 200 or whether said register pins are in the position 228b during the return stroke of the register 200 axially displaced through the distance $b$. However, when a transfer bar 524 is in a horizontal active position (for example see the center transfer bar 524 of Fig. 21), its transfer pin 538 is out of the path of the register pins of the associated register wheel 218 when said register pins are in the position 228 during a forward stroke of the register 200, but its transfer pin 538 is in the path of the register pins of the associated register wheel 218 when said register pins are in the position 228b during a return stroke of the register 200 axially displaced through the distance $b$ so as to perform a tens transfer by rotating the register wheel one step in the direction of the arrow C (see Fig. 3) through an angle equal to $\frac{1}{10}$ of a revolution upon an engagement of a register pin of the register wheel returning in the direction of the arrow B with such a transfer pin 538. Consequently, the transfer pins 538 are laterally spaced from each other at equal distances equal to the distance $a$ between the sets of register pins 228, 228' of adjacent register wheels 218 (see Figs. 2 and 20). Moreover, as best shown in Figs. 2, 3 and 20, the transfer pins 528 of the transfer bars 524 are in a staggered arrangement relative to each other, the transfer pin of the transfer bar associated with the register wheel of the second order being nearest to the register 200 when the latter is at the end of its forward stroke in its intermediate position and the transfer pin of the transfer bar associated with the register wheel of the highest order being nearest to the register 200 when the latter is at the end of its return stroke in its end position, so as to render possible a so-called "chain transfer" starting from a register wheel 218 of lower order to a register wheel or register wheels of higher order during a return stroke of the register 200. Consequently, the transfer pins 538 are longitudinally spaced from each other at equal distances $c$, said distance $c$ being somewhat larger than the division $d$ between adjacent register pins 228, 228' of a register wheel (see Fig. 15) according to the embodiment shown in the drawings.

Furthermore, as may be gathered from Figs. 2, 20 and 21, the transfer bars 524 are arranged in such a relation to the transfer preparers 502, that the lug 520 of the actuating arm 518 of a transfer preparer 502 associated with a register wheel 218 of a certain order is in alignment with the transfer bar 524 associated with the register wheel 218 of the next higher order, so that such a lug 520 of such a transfer preparer 502 may actuate the transfer bar 524 associated with the register wheel 218 of the next higher order. For example, the lug 520 of the transfer preparer 502 associated with the register wheel 218 of the order V may actuate the transfer bar 524 associated with the register wheel 218 of the next higher order, i. e. the order VI.

As mentioned above in connection with the mechanism for clearing the register, and as may be gathered from Figs. 3 and 20, the register pin 228' being of greater length than the remaining register pins 228 of a register wheel 218 is arranged between the numerals 1 and 2. When the long register pin 228' abuts against the lug 506 of the transfer preparer 502 as shown in Fig. 3, the numeral 0 appears in the register window 146, i. e. the register wheel is in its 0-position. During the forward stroke of the register in the direction of the arrow A (see Figs. 3 and 15), the register wheel 218 may be rotated in the direction of the arrow C by certain elements of the setting mechanism 400 to be described hereinafter, so that it may be brought from its 0-position to a 1-position, then to a 2-position, then to a 3-position, etc. Assume now, that during such a forward stroke of the register in the direction of the arrow A a register wheel 218, for example the register wheel of the order V, is brought from its 9-position into its 0-position. During such a rotation of the register wheel 218 of the order V from the 9-position into the 0-position the long register pin 228' turning in the direction of the arrow C hits against the surface 540 (see Fig. 15) of the lug 506 of the transfer preparer 502, so that the latter is swung from the normal position shown in Fig. 3 into the position shown in Fig. 15, whereby the lug 520 of its actuating arm 518 is brought into engagement with the transfer bar 524 associated with the register wheel of the next higher order, i. e. order VI, thus swinging said transfer bar from its normal inactive tilted position into its active horizontal position shown in Fig. 15 and shown for the center transfer bar 524 of Fig. 21. Thus a tens transfer from order V to order VI has been prepared but not yet carried out. Upon a further rotation of the register wheel 218 of the order V from its intermediate 9-0-position between its 9-position and 0-position shown in Fig. 15 during a further movement of the register in the direction of the arrow A, the long register pin 228' becomes disengaged from the lug 506 of the transfer preparer 502, so that the latter drops by the action of its weight or of a spring (not shown) into its normal position limited by the abutting rod 508 as shown in Figs. 3 and 16 for example. During the subsequent return stroke of the register in the direction of the arrow B (see Fig. 3), one register pin of the register wheel 218 of the order VI axially displaced through the distance b (see Fig. 21) comes into engagement with the transfer pin 538 of the transfer bar or transfer performer 524 being now in a horizontal position, whereby the register wheel 218 of the order VI is advanced one step through an angle equal to $\frac{1}{10}$ of a revolution and the tens transfer into said register wheel of the order VI is carried out.

If during such a return stroke of the register 200 the tens transfer carried out by the transfer pin 538 in above described manner into a register wheel 218, for example the register wheel of order VI, causes a rotation of said register wheel from its 9-position into its 0-position, the transfer bar 524 associated with the register wheel 218 of the next higher order, i. e. according to above example the register wheel of the order VII, will be immediately swung from its tilted inactive position into its horizontal active position by means of the transfer preparer 502 associated with the register wheel of order VI, so that the transfer pin 538 of the now horizontal and active transfer bar 524 advances the register wheel 218 of the order VII one step when it passes over said transfer pin, whereby a "chain transfer" has been carried out. As will be readily understood, owing to the staggered arrangement of the transfer pins 538, such a "chain transfer" may continue up to the highest order, if the transfer pins cause a rotation of the actuated register wheel from its 9-position to its 0-position.

5. THE MECHANISM FOR AN AUTOMATIC CLEARING OF THE TENS CARRY MECHANISM

As shown in Figs. 2, 3, 8, 15, 16, 20 and 21, a cylindrical member 542 carrying a cam 544 is secured to each shaft 526 connected with a transfer bar 524 as described above. Each cam 544 is arranged in the plane of travel of the downward extending resetting arm 522 of a transfer preparer 502. As best shown in Figs. 21, the cam 544 of a tilted inactive transfer bar 524 (see the left hand transfer bar 524 of Fig. 21) is out of the path of the downward extending resetting arm 522, so that such a resetting arm will not come into engagement with the cam 544 of a tilted inactive transfer bar 524 during a forward stroke or return stroke of the carriage 116 carrying the register 200 and the transfer preparers 502. When, however, during a forward or return stroke of the register 200 a transfer bar 524 has been brought into an active horizontal position (see Fig. 16 and the center transfer bar 524 of Fig. 21), the cam 544 of such a horizontal transfer bar is in the path of the resetting arm 522 when the carriage 116 is returned in the direction of the arrow B. Therefore, during such a return movement of the resetting arm 522 in the direction of the arrow B, the resetting arm 522 held in its position by the abutting rod 508 comes into engagement with the cam 544, whereby the latter is pressed downwardly causing a rocking of the transfer bar 524 about the axis of its shaft 526 into its inactive tilted position. Thus, the resetting arms 522 contacting the cams 524 shortly before the end of the return stroke of the carriage 116 as shown in Fig. 16 return automatically all transfer bars 524 into the tilted inactive position, insofar as they have been previously swung into a horizontal active position, whereby the tens carry mechanism is automatically cleared shortly before the end of the return stroke of the register 200.

6. THE SETTING MECHANISM

As best shown in Figs. 2–4, 6, 7 and 14–17, the setting mechanism generally indicated by 400 comprises a frame 402 mounted on the crossbars 152 and 154 of the casing 100 and provided with 5 rows of 9 keys 404 each, forming a five-order keyboard. The keys 404 of each row are provided with the digits 1, 2, 3, . . . 9 in an ascending sequence in the direction of the forward stroke of the register 200 as indicated by the arrow A. All keys 404 with the digit 1, all keys with the digit 2, all keys with the digit 3, etc. are in alignment with each other. The keys 404 of the multi-order keyboard are arranged above the plane of the register 200 in such a manner, that their actuating lugs 426 arranged at their lower ends (see Figs. 3, 4, 6 and 10–16) may cooperate with the register pins 228, 228' of the register wheels 218 for rotating the latter about the axis of the register shaft 202.

According to Figs. 2–4, 6, 7 and 10–16, each row of 9 keys 404 is mounted on a rod 406. Said rods 406 are equally spaced from each other at the distance $a$ equal to the distance $a$ between the sets of register pins 228, 228' of adjacent register wheels 218. The rods 406 journalled in suitable bearings of the frame 402 are normally held in a stationary position by the following mechanism: As best shown in Figs. 2, 3 and 7 a lever 408 is rigidly secured to the free end of the rod 406 of the first or units order. Furthermore, a lever 410 is secured to the free end of each of the rods 406 of the higher orders. The levers 408, 410 are connected with each other by a bar 418 pivoted to each of them. The lever 408 is provided with an arm or handle 412 capable of cooperating with stops 414 and 416 rigidly secured to the frame 402. A tension spring 420 stretched between one end of said connecting bar 418 and a stationary point 422 of the frame 402 tends to urge said arm 412 of the lever 408 against the stop 414, whereby the rods 406 are normally held in the position shown in the drawings.

Only the rod 406 of the first order is provided with a downwardly extending actuating pin 430 rigidly secured thereto (see Figs. 2, 3, 7 and 15) for a purpose to be described hereinafter; the rods 406 of the higher orders are not equipped with such an actuating pin 430.

Each of the 9 keys 404 of a row of keys is frictionally mounted on the rod 406, so that on one hand it may be depressed from its normal elevated position shown in the drawings and indicated by 404s' in Figs. 10 and 11 and by 404a' in Figs. 12 and 13 into a depressed position limited by its abutment against a longitudinal stop rod 432 secured to the frame 402 (said depressed position being indicated by 404s'' in Figs. 10 and 11 and by 404a'' in Figs. 12 and 13) although the rod 406 is held immovably by the action of the tension spring 420 as described above, and that on the other hand a freely movable key will participate in a rotation of the rod 406 when the latter is rotated by means of the handle 412 for a purpose to be described hereinafter. The keys 404 may be frictionally coupled with the rods 406 in many different ways. According to the embodiment shown in the drawings the keys 404 are made of a resilient strip of material suitably shaped and frictionally clamped on the rod 406. The set of 9 keys in each rod 406 is prevented from an axial displacement along the rod by the walls of the frame 402.

As may be gathered from Figs. 2, 15 and 16, the digits 1, 2, 3, . . . 9 are visibly arranged on the upper surface of the upper arms of the keys 404. As best shown in Figs. 4, 6 and 10–13, said upper arm of the keys 404 are in an inclined position, and the upper arms of one row of keys 404 overlap to a certain degree the upper arms of the adjacent row of keys of the next lower order.

As best shown in Figs. 3, 4, 6, 7 and 10–16, above mentioned actuating lug 426 of each key 404 is arranged at a right angle to a downward extension 424 of the key. When the key 404 is in its elevated position, said downward extension 424 is in a vertical position as shown in the drawings. As mentioned above, the rods 406 of adjacent orders of the setting mechanism 400 are spaced from each other at the distance $a$ (see Figs. 10 and 11); therefore, the distance between the vertical center line of actuating lugs 426s' or 426a' of elevated keys 404s' or 404a' of adjacent orders likewise equals to the distance $a$ as indicated in Figs. 10 and 11. Furthermore, as may be gathered from Fig. 7, the actuating pin 430 of the first order is in alignment with the actuating lugs 426 of the keys 404 of said first order, when they are in their elevated position.

The actuating lugs 426 of the keys 404 of one row of keys are equally spaced from each other at the distance $e$ (see Figs. 14–16), which is somewhat larger than the division $d$ between the register pins 228, 228' of the register wheels 218. Likewise, the actuating pin 430 is spaced from the actuating lug 426 of the 9-digit-key of the first order at the distance $e$, as best shown in Fig. 15. According to the embodiment shown in the drawings, said distance $e$ equals to the longitudinal distance $c$ between the transfer pins 538 of the transfer bars 524, however, the distance $e$ must not necessarily equal the distance $c$.

As will be readily understood from above and the illustration of Figs. 10–15, when the actuating lugs 426 of the keys 404 and/or the actuating pin 430 are in the path of register pins 228, 228' of register wheels 218 of the register 200 being on its forward stroke in the direction of the arrow A, each time a register pin hits such an actuating lug or the actuating pin, the register wheel carrying such a register pin will be advanced one step equal to $1/10$ of a revolution. For example, if the register wheel was in its 0-position at the start of a calculation, and if 6 actuating lugs 426 of a row of keys 404 come in mesh with register pins of the register wheel during a forward stroke of the register, the register wheel will be advanced 6 steps equaling to an angle of $6/10$ of a revolution, so that it will be in its 6-position at the end of the forward stroke; in other words, the digital value 6, which also may be the nines-complement of the digital value 3, has been added to the digital value 0. Furthermore, for example, if the register wheel was in its 0-position at the start of a calculation, and if 9 actuating lugs 426 of a row of keys 404 come in mesh with register pins of the register wheel during the forward stroke of the register, the register wheel will be advanced 9 steps, so that it will be in its 9-position at the end of the forward stroke; in other words, the digital value 9, which also may be the nines-complement of the digital value 0, has been added to the digital value 0. Moreover, for example, if the register wheel was in its 0-position at the start of a calculation, and if 9 actuating lugs of the row of keys 404 of the first order of the setting mechanism 400 and the actuating pin 430 of said first order come in mesh with register pins of the register wheel during the forward stroke of the register, the register wheel will be advanced 10 steps equal to $10/10$ of a revolution or one full revolution, so that it will be in its 0-position at the end of the forward stroke; in other words, the digital value 10, which in this instance is the tens-complement of the digital value 0 has been added to the digital value 0.

As best shown in Figs. 3 and 14, the downward extension 424 of each key 404 except the 1-digit-key is provided with a projecting setting arm 428 rigidly secured thereto by screws or the like. The projecting free end of such a setting arm 428 is normally in loose contact with the downward extension 424 above the actuating lug 426 of the adjacent key with the next lower digit of the same order. Therefore, the depressing of a key 404 with a certain digit from the elevated position into the depressed position abutting the rod 432 causes simultaneously a depressing of all keys of the same order with lower digits from their elevated position into their depressed position abutting the rod 432, while all keys of the same order with higher digits remain in their elevated position. For example, if the 3-digit-key is depressed, the 1-digit-key and the 2-digit-key are depressed simultaneously, so that the actuating lugs of said three keys are brought into the position 426s'' shown in Figs. 10 and 11 at a distance $f$ from their original position 426s' or into the position 426a'' shown in Figs. 12 and 13 likewise at the distance $f$ from their original position 426a', while the 4-digit-key, the 5-digit-key . . . including the 9-digit-key remain in their elevated position, so that the actuating lugs of said remaining six keys remain in the original position 426s' (Figs. 10 and 11) or 426a' (Figs. 12 and 13). Furthermore, if, for example, the 9-digit-key is depressed, all other keys of the same row will be depressed simultaneously. As a result of this arrangement, obviously, the width w (see Fig. 14) of a key 404 may be made considerably smaller than the width of a finger tip, as it does not matter when the operator touches also adjacent keys with lower digits which are being depressed anyway through the medium of the setting arms 428.

As mentioned above and explained by the illustration of Figs. 38 and 41, during the forward stroke of the register 200 in the direction of the arrow A a register wheel 218 will be advanced as many steps equal to 1/10 of a revolution as actuating lugs 426 of the keys 404 of the setting mechanism 400 come into mesh with its register pins 228, 228'; the actuating pin 430 of the first order I' of the setting mechanism 400 may cause an additional step of advance. Furthermore, as mentioned above and illustrated by said Figs. 38 and 41 wherein depressed keys 400 are indicated by shading, the depressing of a certain key of a row of keys causes simultaneously the depressing of all keys with lower digits of the same row or order of the keyboard of the setting mechanism 400, while the remaining keys with higher digits remain in their position, so that by such a depressing of a key the digital value and the tens-complement thereof—by the inclusion of the actuating pin 430—are simultaneously set in order I' of the setting mechanism and the digital value and the nines-complement thereof are simultaneously set in each of the orders II', III', IV' and V' of the setting mechanism. The actuating lugs 426 of the depressed keys of an order of the setting mechanism are displaced from their original position through the distance f (see Figs. 10–13, 38 and 41), while the actuating lugs 426 of the non-depressed keys remain in their original position. The digital value in one row is set by the number of actuating lugs 426 displaced through the distance f, the complement of the digital value in one row is set by the number of non-displaced actuating lugs (and the actuating pin 430 insofar as order I' is concerned). Therefore, when for example the 2-digit-key of order IV' of the setting mechanism 400 (see Fig. 38) is depressed, the digital value 2 obtained by 2 displaced actuating lugs 426 and the nines-complement of said digital value 2 obtained by 7 non-displaced actuating lugs are set simultaneously. Or, when for example no key of order III' (Fig. 38) is depressed, the digital value 0 obtained by the lack of actuating lugs 426 in the line for displaced actuating lugs and the nines-complement of said digital value 0 obtained by 9 non-displaced actuating lugs are set simultaneously. Or, when for example the 4-digit-key of order I' (Fig. 38) is depressed, the digital value 4 obtained by 4 displaced actuating lugs 426 and the tens-complement of said digital value 4 obtained by 5 non-displaced actuating lugs 426 and by the actuating pin 430 are set simultaneously. Therefore, an addition by adding the addend set in the keyboard to the addend entered previously into the register may be carried out when the setting mechanism 400 is adusted in such a position relative to the register, that the displaced actuating lugs 426 setting the digital values are in the path G of the register pins 228, 228' of the register 200 and the non-displaced actuating lugs 426 are out of said path G during the forward stroke of the register in the direction of the arrow A as shown in Fig. 38. Furthermore, a subtraction by adding the complement of the minuend to the subtrahend entered previously into the register may be carried out when the setting mechanism 400 is adjusted in such a position relative to the register, that the non-displaced actuating lugs 426 and the actuating pin 430 of order I' setting the complementary values of the digital values are in the path G of the register pins 228, 228' of the register 200 and the displaced actuating lugs 426 are out of said path G during the forward stroke of the register in the direction of the arrow A as shown in Fig. 41. The plus-minus-adjuster for obtaining such an adjustment of the setting mechanism 400 relative to the register 200 will be described hereinafter under a separate heading.

If, for example for a problem of addition (see Fig. 39), the four-figure-number 2074 is to be set in the five-order-keyboard, the 4-digit-key is depressed in order I', the 7-digit-key is depressed in order II', no key is depressed in order III', the 2-digit-key is depressed in order IV' and no key is depressed in order V' as shown in Fig. 38. Consequently, the five-figure-number 02074 has been set in the five-order-keyboard, which now may be added to the addend entered previously into the register.

If, for example for a problem of subtraction (see Fig. 42), the four-figure-number 6931 is to be set in the five-order-keyboard, the 1-digit-key is depressed in order II', the 9-digit-key is depressed in order III', the 6-digit-key is depressed in order IV' and no key is depressed in order V' as shown in Fig. 41. Thus, the setting mechanism 400 being in the position shown in Fig. 41, the complementary value 93069 of the five-figure-number 06931 has been set in the five-order-keyboard. In order to render possible the subtraction of a minuend by adding its complementary value to the subtrahend in a calculating machine, it is necessary that the minuend or rather the complementary value of the minuend has the same amount of figures as the subtrahend previously entered into the register. Therefore, it is necessary, to supplement the complementary value set in the keyboard by as many figures as the number entered in the register may have. According to the embodiment shown in the drawings, the register has 9 orders and the keyboard has 5 orders. The difference in the number of orders being 4, means must be provided to supplement the 5-figure-complementary value set in the keyboard by at least 4 figures. For this purpose, as best shown in Figs. 2, 4, 6, 17, and 41, four supplementing racks 434 equally spaced from each other at the distance a are attached to the frame 402 of the setting mechanism 400 by means of brackets 436 rigidly connected thereto. The supplementing rack 434 nearest to the row of keys 404 of the highest order, i. e. order V', is spaced at the distance a from the actuating lugs of the keys of said row, when said actuating lugs are in their original position with the keys in elevated position. Said distances a are equal to the distance a between the set of register pins 228, 228' of adacent register wheels 218. As best shown in Figs. 2, 17 and 41, each supplementing rack 434 is provided with 9 actuating teeth 438 equally spaced from each other at the distance e equal to the distance e between the actuating lugs 426 of the keys 404. Said actuating teeth 438c come in mesh with register pins 228, 228' of register wheels 218, when the setting mechanism 400 is in the position shown in Fig. 41. Thus, the five-figure complementary value 93069 set in the keyboard according to Figs. 41 and 42 is automatically supplemented by the actuating teeth 438 of the supplementing racks 434 to the nine-figure complementary value 999993069, which may be added to a nine-figure number entered into the register for the performance of a subtraction.

As may be gathered from Fig. 38, owing to the spacing of the supplementing racks 434 at the distance $a$ and owing to the displacement of the setting mechanism 400 through the distance $f$ from the path G of the register pins 228, 228' during a forward stroke of the register 200 in the direction of the arrow A when the setting mechanism is adjusted for addition, the actuating teeth 438 of said supplementing racks 434 are out of the path G of the register pins, so that the latter will not be rotated by them during a forward stroke of the register during the performance of an adding operation.

According to the embodiment shown in the drawings, the register 200 has 9 orders I, II . . . IX and the setting mechanism has 5 orders I', II' . . . V'. Of course, a calculating machine according to the invention may have more or less orders in the register and more or less orders in the setting mechanism. In any case, however, the number of supplementing racks 434 must be at least equal to the difference between the number of orders in the register and the number of orders in the setting mechanism. For example, a calculating machine with a 6-order-register and a 3-order setting mechanism would be equipped with at least 3 supplementing racks, or a calculating machine with a 12-order register and a 7-order setting mechanism would be equipped with at least 5 supplementing racks.

The 9 rows of actuating lugs 426 represent a 9-order actuator forming a part of the setting mechanism 400. According to the embodiment shown in the drawings, said multiorder actuator is rigidly connected with the multi-order keyboard by means of the elements 426, which may be considered as forming a part of the keyboard or of the actuator. If desired, however, the keyboard and the actutator could be operatively connected with each other in a different manner, and setting elements corresponding to the setting arms 428 and having the same functions as said setting arms 428 could be arranged in the actuator instead of in the keyboard.

7. THE MECHANISM FOR CLEARING THE SETTING MECHANISM

As shown in Figs. 6 and 7 and as mentioned above, an arm or handle 412 cooperating with the stops 414 and 416 is arranged on the lever 408 secured to the rod 406 carrying the keys 404 of the first order of the setting mechanism 400. As clearly shown in Fig. 7, the lever 408 and the levers 410 secured to the rods 406 carrying the keys 404 of the remaining orders of the setting mechanism 400 are of equal length and are parallel to each other. The levers 408, 410 are connected with each other by the connecting bar 418, and the keys 404 are frictionally mounted on the rods 406, as described above. When a certain numerical value has been set in the keyboard in each order, a number of keys may be in the depressed position indicated for example by 404$s''$ in Fig. 10 and a number of keys may be in the elevated position indicated for example by 404$s'$ in Fig. 10.

Now, in order to clear the setting mechanism, the handle 412 (Fig. 7) is manually swung about the axis of the rod 406, until it abuts against the stop 416. Such a swinging movement causes a simultaneous equal rotation of all rods 406 connected with each other by means of the mechanism 408, 418, 410 from their normal position into an interim position. The keys being in a depressed position and being arrested by the abutting rods 432 will slide on the rods, while the keys being in an elevated position and being frictionally coupled with the rods 406 will participate in the rotation of the rods, until they are in alignment with the previously depressed keys resting on the abutting rods. Now, upon a release of the arm 412, the tension spring 420 acting on the connecting bar 418 returns all rods 406 from their interim position into their original position limited by an abutment of the arm 412 against the stop 414. During such a return movement of the rods 406 all keys 404 in all orders participate in said return movement. The angular movement of the arm 412 and the rods 406 limited by the distance between the stops 414 and 416 is of such a degree, that during such a return movement of the rods 406 the actuating lugs of the keys 404 are moved through the distance $f$ (see Fig. 10) for example from the position 426$s''$ into the position 426$s'$, so that upon an abutment of the arm 412 (see Fig. 7) against the stop 414 at the end of such a clearing operation all keys 404 of all orders of the keyboard are again in this original elevated position and the setting mechanism is perfectly cleared.

8. THE MECHANISM FOR ADJUSTING THE CALCULATING MACHINE FOR ADDITION AND SUBTRACTION

As explained above in connection with Fig. 38 illustrating the position of the setting mechanism 400 relative to the register 200 during an addition and in connection with Fig. 41 illustrating the position of the setting mechanism 400 relative to the register 200 during a subtraction, the calculating machine must be provided with a plus-minus-adjuster, by means of which the setting mechanism 400 may be displaced through the distance $f$.

As best shown in Figs. 2, 6, 17, 38 and 41, such a plus-minus-adjuster comprises a plus-minus-adjusting element 440 having a stop 442 for plus-operation or addition and a stop 444 for minus-operation or subtraction, said stops being arranged for cooperation with the frame 402 of the setting mechanism. According to Figs. 2, 6 and 17, said plus-minus adjusting element 440 is slidably arranged on the cross-bar 154 of the casing 100, the distance between its stops 442 and 444 being larger by the distance $f$ than the width of the frame 402 slidably arranged on the same cross-bar 154 and on the cross-bar 152 of the casing 100. The plus-minus adjusting element 440 is held in a predetermined position or place relative to the register 200 by means of a spring 446 secured to the plus-minus adjusting element 440 and engaged with one of the 5 notches 448 of the cross-bar 154. Said spring 446 engaged with a notch 448 and an abutting suface 450 of the plus-minus adjusting element 440 engaged with the frame 402 prevents the plus-minus adjusting element from rotation about the cross-bar 154. Furthermore, the frame 402 is held in a predetermined position relative to the plus-minus adjusting element 440 by means of a spring 452 secured to the plus-minus adjusting element and engaged with one of 2 notches 454 of the frame 402 spaced from each other at the distance $f$ (see Figs. 2 and 7). A plus-minus adjusting knob 456 mounted on the frame 402 serves for a convenient manual displacement of the frame 402 relative to the plus-minus adjusting element 440 through the distance $f$ one way or the other. According to Figs. 2 and 41, the frame 402 is in such a position relative to the plus-minus adjusting element 440, that it abuts against the minus-stop 444, in other words the setting mechanism 400 is adjusted for a subtraction. Now, if an addition is adjusted for a subtraction. Now, if an addition shall be carried out, the frame 402 is displaced to the right through the distance $f$, until it abuts against the plus-stop 442 as shown in Fig. 38, whereupon the setting mechanism 400 is adjusted for an addition. For convenience, "+" and "—" signs may be applied to the plus- and minus-stops or to elements nearby as shown in the drawings.

The position of the actuating lugs 426 of the actuator relative to the register pins of the register during the forward and return stroke thereof when the setting mechanism is adjusted in above described manner for subtraction may be gathered from Figs. 10 and 11.

Fig. 10 illustrates said relative position of the actuating lugs for a subtraction during the forward stroke of the register 200. The actuating lugs of the non-depressed keys 404s' setting the complementary value to be added into the register 200 are in the position 426s' in the path of the register pins 228, so that they may rotate the register wheels 218 during the forward stroke thereof. The actuating lugs of the depressed keys 404s'', however, are out of the path of the register pins 228. As described above, shortly before the end of the forward stroke, the register 200 is axially displaced through the distance $b$, so that tens transfers may be carried out by the action of the transfer pins 538 of the transfer bars 524. Therefore, during the return stroke of the register 200, the register pins will be in the position 228b as shown in dotted lines in Fig. 10 and in full lines in Fig. 11.

As may be gathered from Fig. 11, the actuating lugs being in the position 426s' and the actuating lugs being in the position 426s'' are out of the path of the register pins 228b during the return stroke of the register. Consequently, the actuating lugs of the set actuator cannot cause a further rotation of the register wheels 218 during the return stroke of the register.

The position of the actuating lugs 426 of the actuator relative to the register pins of the register during the forward and return stroke thereof when the setting mechanism is adjusted in above described manner for addition may be gathered from Figs. 12 and 13.

Fig. 12 illustrates said relative position of the actuating lugs for an addition during the forward stroke of the register 200. Compared with Fig. 10, the register is in the same position, but the setting mechanism 400 has been displaced to the right through the distance $f$. Therefore, now the actuating lugs of the depressed keys 404a'' setting the value to be added into the register 300 are in the position 426s'' in the path of the register pins 228, so that they may rotate the register wheels 218 during the forward stroke thereof. The actuating lugs of the non-depressed keys 404a'', however, are out of the path of the register pins.

When during the return stroke of the register 200 the register pins are in the position 228b shown in dash lines in Fig. 12 and in full lines in Fig. 13, the actuating lugs being in the position 426a' and the actuating lugs being in the position 426a'' are out of the path of said register pins. Consequently, the actuating lugs of the said actuator cannot cause a further rotation of the register wheels 218 during the return stroke of the register.

9. THE PLACE-SHIFTING MECHANISM

According to Figs. 2, 4 and 5, for example, the setting mechanism 400 including the keyboard and the actuator is in such a position relative to the register 200 that the actuating lugs rigidly connected with the keys 404 of a certain order of the keyboard may cooperate with the register pins of the register wheel 218 of the same order of the register, i. e. the actuating lugs of the first order of the actuator may cooperate with register pins of the first order of the register, those of the second order of the actuator may cooperate with register pins of the second order, etc. The performance of a multiplication or a division, however, may require that the place of the actuator of the setting mechanism 400 be shifted relative to the register 200, so that the actuating lugs rigidly connected with the keys 404 of the first order of the keyboard may cooperate with register pins of the register wheel 218 of the second order, the actuating lugs rigidly connected with the keys of the second order of the keyboard may cooperate with register pins of the register wheel 218 of the third order, etc. as shown in Figs. 38 and 41, or so that the actuating lugs rigidly connected with the keys 404 of the first order of the keyboard may cooperate with register pins of a register wheel of still higher order, etc.

In order to carry out such a place-shifting of the setting mechanism 400 comprising the actuator relative to the register 200, the calculating machine is provided with the following place-shifting mechanism: As mentioned above, the plus-minus adjusting element 440 (see Figs. 2 and 17) is held in a predetermined place by means of a spring 446 engaged with one of 5 notches 448 of the cross car 154 of the casing 100. The notch 448 receiving the spring 446 according to the showing of Fig. 2 is in such a position, that the actuating lugs of the keys 404 of the first order of the keyboard may cooperate with register pins of the register wheel 218 of the first order of the register 200, whether the frame 402 is adjusted in the position for subtraction (shown in Fig. 2) or in the position for addition as described above. The notches 448 are equally spaced from each other at the distance $a$ equal to the distance $a$ between the register pins 228 of adjacent register wheels 218 of different orders. As will be readily understood, a shifting of the plus-minus adjusting element 440 embracing the frame 402 from the position shown in Fig. 2 through one distance $a$ to the left until the spring 446 snaps into the next notch 448 brings the frame 402 of the setting mechanism 400 into such a position that the actuating lugs of the keys of the first order of the keyboard may cooperate with register pins of the register wheel 218 of the second order. Said place of the setting mechanism 400 relative to the register 200 is illustrated by Figs. 38 and 41, wherein order I' of the keyboard is associated with order II of the register, order II' of the keyboard is associated with order III of the register, etc. Furthermore, as will be readily understood from above, in each place of the plus-minus adjusting element 440, whether its spring 448 is engaged with the first notch 448 or any other notch of the series of 5 notches, the frame 402 may be adjusted for addition or subtraction by displacement through the distance $f$ relative to the plus-minus adjusting element 440. The calculating machine has at least one notch 448 more than the difference between the number of orders in the register and the number of orders in the keyboard. A place-shifting knob 458 is mounted on the plus-minus adjusting element 440 for facilitating the manual place-shifting operation.

10. THE COUNTER

As best shown in Figs. 2, 3, 4, 8, 15, 16 and 22-25, the counter 300 arranged for indicating the multiplier in case of a multiplication or the quotient in case of a division by counting the number of reciprocations consisting of forward and return strokes of the register 200 comprises a shaft 302 rotatably arranged in the reciprocable carriage for simultaneous reciprocating movements of the counter with the register in a straight line motion parallel to the setting mechanism. The shaft 302 is prevented from an axial displacement by means of set collars 304 secured thereto (see Figs. 2 and 4). A spring 306 secured to the frame of the carriage 116 and arranged for engagement with a recess 308 of the shaft 302 tends to hold said shaft normally in the position shown in Figs. 2-4, 8 and 15; said spring 306, however, does not prevent the shaft 302 from rotation, when the latter is manually rotated by means of a knurled resetting knob 310 secured to the end of the shaft for a clearing of the counter 300 in a manner to be described hereinafter.

According to Fig. 2, a sleeve 312 having a slot 314 engaged with a pin 316 secured to the counter shaft 302 is slidably mounted on the latter for displacement in the direction of its longitudinal axis. Owing to above mentioned pin-slot connection 316, 314, the sleeve 312 cannot be rotated relative to the counter shaft 302 but will participate in any rotation of said counter shaft.

The sleeve 312 coupled with the counter shaft 302 in above described manner and normally held in the position shown in Fig. 2 by means of the spring 306 cooperating with the recess 308 of the counter shaft carries a plurality of counter wheels 318. The counter 300 has at least one counter wheel 318 more than the difference between the number of orders in the register 200 and the number of orders in the setting mechanism 400. According to the embodiment of a calculating machine with a 9-order-register and a 5-order-keyboard shown in the drawings, the multi-order counter 300 is equipped with 5 counter wheels 318.

Said counter wheels 318 are prevented from an axial displacement relative to the sleeve 312 by means of set collars 320 secured to said sleeve at the ends thereof. On the other hand, said set collars 320 cause an axial displacement of the set of counter wheels 318 together with the sleeve 312, when the latter is axially displaced at the end of a forward stroke and rearward stroke of the register 200 by means of the coupling rod 322 (see Figs. 2 and 8) having its hook-like ends engaged with a groove 324 of the counter sleeve 312 and a groove 246 of the register sleeve 212, which is subject to axial displacements through the distance $b$ as described above.

Each counter wheel 318 is frictionally coupled with the counter sleeve 312 by means of a spring 326 arranged within a cylindrical recess 328 of the counter wheel (see Figs. 2 and 3); one end of such a spring 326 is secured to a wall of such a recess 328, the other end of such a spring 326 is resiliently engaged with the surface of the sleeve 312. Thus, each counter wheel 318 may be rotated relative to the sleeve 312 by means of a counter actuator arranged on the frame 402 of the setting mechanism 400 and generally indicated by 330 (see Figs. 2, 3, 8 and 22-25) as will be described hereinafter, when the sleeve 312 is held in its position by means of the spring 306 acting on the counter shaft 302, the spring 326 of the counter wheel 318 then sliding along the surface of the sleeve 312 and causing a slight braking action on the counter wheel. On the other hand, each counter wheel 318 may be manually rotated simultaneously with the sleeve 312 through the medium of the spring 326, when said sleeve 312 is rotated by means of the resetting knob 310, unless or until such counter wheel is prevented from rotation by stopping means to be described hereinafter, whereupon the sleeve 312 may be rotated relative to the thus stopped counter wheel, the surface of the sleeve 312 then sliding along the contacting surface of the spring 326.

Each counter wheel 318 is provided on its circumference with 10 equally spaced counter pins 332 of equal length (see Figs. 2, 3, 8 and 22-25), which, for the sake of clearness, are shown in somewhat exaggerated scale in the drawings. During a forward stroke in the direction A or during a return stroke in the direction B of the carriage 116 carrying the register 200 and the counter 300 one counter pin 332 of such a set of 10 counter pins 332 of one counter wheel 318 may come into engagement with a certain element of the counter actuator 330 as will be described hereinafter. When such an engagement takes place, the respective counter wheel 318 will be rotated one step through an angle equal to $\frac{1}{10}$ of a revolution in the direction of the arrow H or K (see Figs. 3 and 8) depending on the engagement taking place during a forward stroke or during a return stroke of the carriage 116.

Furthermore, each counter wheel 318 is provided with 10 numerals 0, 1, 2, 3 ... 9 on its circumference, said numerals being arranged in an ascending sequence with respect to a rotation of the counter wheel in the direction of the arrow H. Each of said numerals is placed in a space between two counter pins as shown in Figs. 2 and 22-25.

The counter wheels 318 are of equal diameter and width. However, the diameter of the counter wheels 318 is smaller than the diameter of the register wheels 218 and the counter pins 332 are short enough, that, as best shown in Figs. 3 and 8, during a reciprocating movement of the counter 300 the counter pins 332 do not come into engagement with the cross-wires 238, 240, the actuating lugs 426 and the actuating pin 430 of the setting mechanism 400 and the transfer pins 538 of the transfer bars 524. The sets of counter pins 332 of the counter wheels 318 are equally spaced from each other at the distance $a$, i. e. the same distance as the distance $a$ between the sets of register pins 228, 228' of adjacent register wheels (see Figs. 3 and 22-25).

As the counter 300 is coupled with the register 200 through above described coupling rod 322, the counter pins 332 are displaced through the distance $b$ (see Figs. 22-25) into the position $332b$, when the register pins are displaced into the position $228b$ at the end of the forward stroke of the carriage 116. Likewise the counter pins are returned into their original position 332 through the distance $b$ together with a return displacement of the register pins shortly before the end of the return stroke of the carriage 116.

11. THE MECHANISM FOR ACTUATING THE COUNTER

As best shown in Figs. 3, 8 and 22–25, the counter actuater 330 comprises an actuating plate 334 of transparent material having an upwardly extending flange 336 at one of its ends and having three unequally spaced downwardly extending actuating teeth 338, 340, 342 at its other end. The tooth 338 is spaced from the tooth 340 at the distance $h$, and the tooth 340 is spaced from the tooth 342 at the distance $m$. The flange 336 is provided with a slot 344 slidably engaged with two head-screws or bolts 346, 348 secured to the frame 402 of the setting mechanism 400. The counter actuator 330 may be manually displaced to the right or to the left (as viewed in Figs. 22–25) by means of a handle 350 projecting from the flange 336. The left hand end position or "division"-position of the counter actuator 330 (see Figs. 22 and 23) is limited by an abutment of the right hand end of the slot 344 against the bolt 348 acting as a stop; the right hand end position or "multiplication"-position of the counter actuator 330 (see Figs. 24 and 25) is limited by an abutment of the left hand end of the slot 344 against the bolt 346 acting as a stop. The length $f$ of displacement in one direction or the other equals to the distance $f$ through which the setting mechanism 400 may be displaced as described above for adjusting same for an addition or subtraction. For convenience, aforementioned "division"-position and "multiplication"-position of the counter actuator 330 may be indicated by "÷" and "×" signs applied to parts of the machine nearby said positions as shown in the drawings.

As best shown in Figs. 2 and 8, the plate 334 extends below the top surface of the casing 100 and the register window 146 arranged therein. Said plate 334, however, does not prevent the operator from reading off the register 200, as it is made of transparent material. The actuating teeth 338, 340, 342 are arranged in such a position, that they cannot come into engagement with the register pins 228, 228' of the register, that, however, one of them may come in mesh with a counter pin 332 of a counter wheel 318 during the forward stroke of the carriage 116, or that one of them may come in mesh with a counter pin of a counter wheel during the return stroke of the carriage before the counter pins have been returned from their axially displaced position 332b into their original position 332.

Referring now to Fig. 22 illustrating the counter actuator in its "division"-position (the counter actuator is in its extreme left hand position relative to the frame of the keyboard) and the keyboard in its "minus"-position (the frame of the keyboard abuts against the minus-stop of the plus-minus adjusting element): The actuating tooth 342 is in alignment with the counter pins 332 of the counter wheel 318 of the first order, when the latter is on its forward stroke. During the return stroke of the counter, the counter pins of the counter wheel 318 of the first order are displaced through the distance $b$ into the position 332b shown in dash lines, so that during such a return stroke the actuating tooth 342 is out of the path of said register pins. Neither the actuating tooth 340 nor the actuating tooth 338 are in alignment with counter pins of the counter wheels of the first order or of the adjacent order during a forward or return stroke of the counter, as the distance $m$ is larger than the distance $b$ and the distance $m+h$ is smaller than the distance $a$. Therefore, if the counter actuator 330 and the keyboard 404 are in the position shown in Fig. 22, during each reciprocation of the carriage carrying the register and the counter 300, i. e. a movement comprising a forward and a return stroke of the counter, the counter wheel 318 of the first order is advanced one step equal to 1/10 of one revolution in the direction of the arrow H (see Fig. 3) by the actuating tooth 342 during the forward stroke of the counter. In other words, the value 1 has been added to the value previously entered into the counter wheel. As will be readily understood, the position of the counter actuator 330 and keyboard 404 illustrated in Fig. 22 represents the position of these members for the performance of a division by adding the complementary value of the divisor set in the keyboard to the dividend previously entered into the register, the quotient being indicated by the value appearing in the counter.

Referring now to Fig. 23 illustrating the counter actuator in its "division"-position (the counter actuator is in its extreme left hand position relative to the frame of the keyboard) and the keyboard in its "plus"-position (the frame of the keyboard abuts against the plus-stop of the plus-minus adjusting element): Now, the actuating tooth 342 displaced through the distance $f$ to the right is out of the path of the counter pins 332 of the counter wheel 318 of the first order during the forward and return stroke of the counter 300. However, as the distance $m+h$ equals the distance $f+b$, now the actuating tooth 338 is in the path of the counter pins of the counter wheel 318 of the first order when they are in their axially displaced position 332b shown in dash lines during the return stroke of the counter. During the forward stroke of the counter, of course, said actuating tooth 338 is out of the path of the counter pins 332 of the counter wheel of the first order. Furthermore, as the distance $h$ is smaller than the distance $a$, the actuating teeth 340 and 342 are not in alignment with counter pins of the counter wheel of the first order or of the adjacent order during a forward or return stroke of the counter. Therefore, of the counter actuator 330 and the keyboard 404 are in the position shown in Fig. 23, during a reciprocation of the carriage carrying the counter 300, the counter wheel 318 of the first order is advanced through one step equal to 1/10 of one revolution in the direction of the arrow K (see Fig. 3) by the actuating tooth 338 during the return stroke of the counter. In other words, in such an instance the value 1 has been subtracted from the value previously entered into the counter wheel. As will be readily understood, the position of the counter actuator 330 and keyboard 404 illustrated in Fig. 23 represents the position of these members for canceling during a division an excess entry into the register and the counter by adding the value set in the keyboard to the value previously entered into the register and by subtracting the number of excess entries from the quotient entered previously into the counter.

Referring now to Fig. 24 illustrating the counter actuator in its "multiplication"-position (the counter actuator is in its extreme right hand position relative to the frame of the keyboard) and the keyboard is in its "plus"-position (the frame of the keyboard abuts against the plus-stop of the plus-minus adjusting element): Now, again the actuating tooth 342 displaced through the distance $f+f=2f$ to the right (if compared with its position in Fig. 22) is out of the path of the counter pins 332 of the counter wheel 318 of the first order during the forward and return stroke of the counter 300. However, as the distance $2f$ equals the distance $m$, now the actuating tooth 340 is in the path of the counter pins 332 of the counter wheel 318 of the first order during the forward stroke of the counter 300. During the return stroke of the counter, of course, the counter pins, now in the position 332b shown in dash lines, are out of alignment with the actuating tooth 338. Furthermore, as the distance $h$ is smaller than the distance $b$ and the distance $m$ is larger than the distance $a-b$, neither the actuating tooth 338 nor the actuating tooth 342 are in the path of the counter pins 332 of the counter wheel 318 of the first order or of the adjacent order during a forward or return stroke of the counter. Therefore, if the counter actuator 330 and the keyboard 404 are in the position shown in Fig. 24, during each reciprocation of the carriage carrying the register and the counter 300 the counter wheel 318 of the first order is advanced one step equal to $\frac{1}{10}$ of one revolution in the direction of the arrow H (see Fig. 3) by the actuating tooth 338 during the forward stroke of the counter. In other words, the value 1 has been added to the value previously entered into the counter wheel. As will be readily understood, the position of the counter actuator 330 and the keyboard 404 illustrated in Fig. 24 represents the position of these members for the performance of a multiplication by adding the value of the multiplicand set in the keyboard to the value (product) previously entered into the register, the multiplier being indicated by the value appearing in the counter.

Referring now to Fig. 25 illustrating the counter actuator in its "multiplication"-position (the counter actuator is in its extreme right hand position relative to the frame of the keyboard) and the keyboard is in its "minus"-position (the frame of the keyboard abuts against the minus-stop of the plus-minus adjusting element): Now, if these positions are compared with the positions shown in Fig. 24, it becomes obvious that the actuating tooth 342 has been displaced to the left through the distance $f$, so that now said actuating tooth 342 is at the distance $2f-f=f$ to the right of the path of the counter pins 332 of the counter wheel 318 of the first order. Consequently, the positions of Fig. 25 compared with the positions of Fig. 23, the same condition for the actuation of the counter wheel prevails in both cases. Therefore, when the counter actuator 330 and the keyboard 404 are in the position shown in Fig. 25, during each reciprocation of the carriage carrying the register and the counter 300, the counter wheel 318 of the first order is advanced through one step equal to $\frac{1}{10}$ of one revolution in the direction of the arrow K (see Fig. 3) by the actuating tooth 338 during the return stroke of the counter. In other words, in such an instance the value 1 has been subtracted from the value previously entered into the counter wheel. As will be readily understood, the position of the counter actuator 330 and the keyboard 404 illustrated in Fig. 25 represents the position of these numbers for canceling during a multiplication an excess entry into the register and counter by adding the complementary value set in the keyboard to the value previously entered into the register and by subtracting the number of excess entries from the multiplier entered previously into the counter.

In other words, as will be readily understood from above, the counter actuator 330 may be adjusted relative to the counter wheel 318 in a "plus"- or "minus"-position. Furthermore, in said "plus"-position it may be adjusted in a "multiplication"-position (see Fig. 24) or in a "division"-position (see Fig. 23), and, likewise, in said "minus"-position it may be adjusted in a "multiplication"-position (see Fig. 25) or in a "division"-position (see Fig. 22).

As the sets of counter pins 332 are equally spaced from each other at the distance $a$ which is also the distance between the notches 448 (see Fig. 2) of the cross-bar 154 determining the position of the plus-minus adjusting element 440 in the various places when a place-shifting is carried out as described above, it will be readily understood, that the counter actuator 340 will actuate in the manner described above the counter wheel 318 of the second order, when the setting mechanism 400 is shifted into the second place (order I' of the keyboard being associated with order II of the register as shown in Figs. 28 and 41), or will actuate the counter wheel 318 of the third order, when the setting mechanism 400 is shifted into the third place, etc.

Moreover, if desired, means could be provided for displacing the counter actuator into a neutral position along the frame of the setting mechanism, wherein its actuating teeth are out of the path of the counter pins of any counter wheel, when the operation of the counter is not needed for a calculation.

12. THE MECHANISM FOR CLEARING THE COUNTER

As best shown in Figs. 2, 3, 8 and 22-25, each counter wheel 318 is provided with a clearing pin 352. Said clearing pins 352 are arranged in such a manner that each of them is in engagement with the lower surface at the end of a stopping tooth 354 (see Figs. 3 and 8) of a stopping comb 356 attached to the casing 100 of the calculating machine, when the carriage 116 carrying the counter 300 is in its starting or end position and the numeral 0 appears on each counter wheel 318. The stopping teeth 354 do not interfere with the counter pins 332, as the clearing pin 352 arranged for cooperation with said stopping teeth 354 is at a certain distance from the set of counter pins 352 of a counter wheel. Furthermore, as best shown in Figs. 23 and 25, the clearing pin 352 of a counter wheel 318 cannot come into engagement with any one of the actuating teeth 338, 340, 342 of the counter actuator 330, as the clearing pin 352 being of shorter length than the counter pins 332 is short enough to pass below the end of any one of the actuating teeth 338, 340, 342.

In order to clear or zeroize the counter 300 after a calculation performed by the machine, the resetting knob 310 secured to the counter shaft 302 is turned through one revolution in the direction of the arrow K (see Figs. 2, 3 and 8). Such a rotation of the resetting knob 310 causes a rotation of the sleeve 312, which is coupled with the counter shaft 302 by the pin-slot connection 316, 314 and carries the set of counter wheels 318. As described above, each of the counter wheels 318 is frictionally coupled with the sleeve 312. Now, insofar as the counter wheels 318 are in such a position that the numeral 0 appears in the counter window 148 (see Figs. 3 and 8) prior to the zeroizing operation, the clearing pin 352 abuts against a stopping tooth 354 of the stopping comb 356, whereby the counter wheel is blocked, so that the rotation of the counter shaft 302 and sleeve 312 by the resetting knob 310 remains without influence on such a counter wheel frictionally coupled with said sleeve 312. Insofar as the counter wheels 318 are in such a position that a numeral other than 0 appears in the counter window, for example, in the position of the counter wheel of the first order shown in Figs. 23 and 25, the counter wheel will participate in the rotation of the counter shaft 302 and sleeve 312 by the resetting knob 310, until the clearing pin 352 abuts against a stopping tooth 354 of the stopping comb 356, whereupon the counter wheel is arrested in its 0-position. Thus, when after one revolution of the counter shaft 302 by the resetting knob 310 the spring 306 (see Fig. 2) cooperating with the recess 308 holds again the shaft 302 in its position, only the numerals 0 appear in the counter window 148 as shown in Fig. 9, i. e. the counter has been properly cleared or zeroized.

13. THE OPERATION OF THE CALCULATING MACHINE

During the performance of a calculation, be it an addition, a subtraction, a multiplication or a division, the forward stroke of the register 200 and counter 300 may be carried out in the manner shown in Fig. 9. Accordingly, the operator of the calculating machine holds the casing 100 thereof with his index fingers and urges the register 200 and counter 300 in the direction of the arrow A against the action of the spring 136 by gripping the projecting ends of the register shaft 202 with his thumbs. The register 200 and counter 300 are automatically returned into the position shown in Fig. 9 by the action of the spring 136 upon a yielding of the gripping effect on the register shaft 202.

a. An addition

Assume, 2074 shall be added to 99987654 in such a way that the setting mechanism 400 is in the second place, i. e. that the first order I' of the setting mechanism 400 is associated with the second order II of the register 200 (see Fig. 38). Such a problem of addition would be written in the manner shown in Fig. 39.

Assume further, that the number 99987654 is the result of some calculation carried out previously so that the number 099987654 appears in the register window as being entered into the register. This number is also shown in the chart of Fig. 40 as the number appearing in the register window at the start of the calculation.

For the performance of the addition, the plus-minus adjusting element 440 is shifted into the second place, i. e. the spring 446 (see Fig. 2) is brought into engagement with the notch 448 arranged at the distance a to the left of the notch 448 engaged with the spring 446 in the position shown in Fig. 2. After the plus-minus adjusting element 440 has been brought into said second place, the frame 402 of the setting mechanism 400 is brought into the "plus" position shown in Fig. 38, wherein said frame 402 abuts against the plus-stop 442 of the plus-minus adjusting element 440.

Now, the number 2074 is set in the keyboard by depressing the 4-digit-key of order I', depressing the 7-digit-key of order II' and depressing the 2-digit-key of order IV' of the keyboard, as indicated in Fig. 38. Such a depressing of said keys brings the actuating lugs 426 of the 1-digit-key, 2-digit-key, 3-digit-key and 4-digit-key of order I' into the path G of the register pins 228, 228' of the register wheel 218 of order II of the register 200. The actuating lugs of the 5-digit-key, 6-digit-key, ... 9-digit-key of order I' as well as the actuating pin 430 of said order I' remain out of the path G of the register pins of the register wheel 218 of order II. Furthermore, the acuating lugs of the 1-digit-key, 2-digit-key ... 7-digit-key of order II' are brought into the path G of the register pins of order III, while the 8-digit-key and 9-digit-key of said order II' remain out of the path G of the register pins of said order III. The actuating lugs of all keys of order III' remain out of the path G of the register pins of the register wheel of order IV. The actuating lugs of the 1-digit-key of order IV' are brought into the path G of the register pins of the register wheel of order V while the actuating lugs of the 3-digit-key, 4-digit-key ... 9-digit-key of order IV' remain out of the path G of the register pins of the register wheel of order V. The actuating lugs of all keys of order V' remain out of the path G of the register pins of the register wheel of order VI.

Of course, there are also no actuating lugs in the path of the register pins of the register wheel of order I and of the register wheels of order VII, VIII and IX.

Now considering the variations in the position of the register wheels of order I, II . . . IX in connection with the chart shown in Fig. 40 during a forward stroke of the register in the direction of the arrow A:

*Order I.*—There is no change at all in the position of the register wheel of order I, as the register pins of said register wheel do not come into engagement with any actuating lug. Therefore, the register wheel of order I being in its 4-position at the starting position (indicated by Start) of the register is in the same 4-position in the intermediate position (indicated by Interm.) of the register at the end of the forward stroke in the direction of the arrow A.

*Order II.*—The register wheel of order II is in its 5-position at the start of the forward stroke. During its forward stroke, the register pins come into engagement with the actuating lugs of the 1-digit-key, 2-digit-key, 3-digit-key and 4-digit-key so that it is advanced 4 steps from 5 to 9. Thereafter, said register wheel remains in its 9-position up to the end of the forward stroke when the register is in its intermediate position.

*Order III.*—The register wheel of order III is in its 6-position at the start. During its forward stroke, the register pins come into engagement with the actuating lugs of the 1-digit-key, 2-digit-key . . . 7-digit-key, so that the register wheel is advanced 7 steps from its 6-position into its 3-position. During said advancing steps the register wheel of order III passes between the 3rd and the 4th step from its 9-position into its 0-position. As explained above, at this time a tens-transfer is prepared in order IV by means of the transfer preparer 502 associated with the register wheel of order III; at this time, said transfer preparer swings the transfer bar 524 associated with the register wheel of order IV from its tilted inactive position into its horizontal active position. Such a preparation of a tens transfer in order IV is indicated by the letter P in order IV of Fig. 40. After the 7th step, the register wheel of the order III remains in its 3-position.

*Order IV.*—The register wheel of order IV remains from the starting position of the register up to the intermediate position of the register in its 7-position, as its register pins do not come into engagement with any actuating lug.

*Order V.*—During the forward stroke of the register, the register pins of the register wheel of order V come into engagement with the actuating lugs of the 1-digit-key and 2-digit-key, so that the register wheel is advanced 2 steps from its 8-position into its 0-position wherein it remains up to the intermediate position of the register. During its transit from its 9-position into the 0-position, i. e. between the first and the second step, the transfer preparer associated with the register wheel of order V prepares a tens-transfer in order VI by swinging the transfer bar of said order VI from its tilted inactive position into its horizontal active position. The preparation of this tens-transfer is indicated by the letter P in order VI in the chart of Fig. 40.

*Orders VI–IX.*—The register wheels of said orders remain in their position during the entire forward stroke of the register, as they do not come into engagement with any actuating lug.

As will be readily understood from above and as may be seen in Fig. 40, if there were a window for reading off the register in its intermediate position (indicated by Interm.) in Fig. 40, the number 099997394 could be read off at the end of the forward stroke.

Now considering the variations in the position of the register wheels of order I, II . . . IX in connection with the chart shown in Fig. 40 during a return stroke of the register in the direction of the arrow B:

It may be repeated for better understanding, that during the return stroke of the register the set of register wheels is axially displaced through the distance b (see Figs. 2, 10 and 11) and that then the actuating lugs of the depressed and non-depressed keys of the keyboard are out of the path of the register pins of the register wheels. Therefore, during the return stroke of the register, the setting mechanism 400 causes no further advance of the register wheels. However, wherever a tens-transfer has been prepared during the forward stroke of the register or wherever a tens-transfer will be prepared during the return stroke of the register, a transfer pin 538 of a transfer bar 524 being in its horizontal active position will advance the associated register wheel 218 one additional step.

*Order I.*—As shown in Fig. 40 the register wheel of order I remains in its 4-position during the entire return stroke of the register from its intermediate position into its end position.

*Order II.*—The register wheel of order II remains in its 9-position during the entire return stroke of the register.

*Order III.*—The register wheel of order III remains in its 3-position during the entire return stroke of the register.

*Order IV.*—At the beginning of the return stroke of the register, the register wheel of order IV remains in its 7-position. However, as soon as a register pin of said register wheel comes into engagement with the transfer pin 538 of the transfer bar 524 brought into its horizontal active position during the forward stroke of the register as mentioned above, the register wheel of order IV is advanced 1 step, so that it is advanced from its 7-position into its 8-position. In other words, the tens-transfer has been carried out as indicated by the letter T in the chart of Fig. 40. During the rest of the return stroke of the register, the register wheel of order IV remains in its 8-position.

*Order V.*—The register wheel of order V remains in its 0-position during the entire return stroke of the register.

*Order VI.*—The register wheel of order VI remains in its 9-position until a register pin hits the transfer pin of the transfer bar associated with order VI, which has been brought into its horizontal position by the transfer preparer associated with the register wheel of order V during the forward stroke of the register as mentioned above. As the transfer pins 538 are arranged in a staggered arrangement (see Figs. 2 and 20) the advance of the register wheel of order VI through an additional step by the transfer bar takes place after the register wheel of order IV has been advanced through an additional step for the performance of a tens-transfer as mentioned above. Therefore, if according to the chart shown in Fig. 40 the tens-transfer T in order IV is performed during step 4, the tens-transfer T in order VI is performed during step 6. During said tens-transfer in order VI the register wheel of order VI turns from its 9-position into its 0-position and, consequently, during said transit a tens-transfer is being prepared in order VII by swinging the tens-transfer bar associated with order VII from its tilted inactive position into its horizontal active position as indicated by the letter P in chart 40. Owing to the staggered arrangement of the transfer bars said preparation of the tens-transfer in order VII takes place before a register pin of the register wheel of order VII may come into engagement with the transfer pin of the actuated transfer bar of order VII. After the performance of the tens-transfer T in order VI, the register wheel of order VI remains in its 0-position up to the end of the return stroke of the register.

*Order VII.*—The register wheel of order VII remains in its 9-position during the return stroke of the register until a register pin comes into engagement with the transfer pin of the associated transfer bar, which during above described preparation of a tens transfer during the return stroke of the register has been brought into the horizontal active position. Upon engagement of a register pin with a transfer pin of the transfer bar of order VII, a tens transfer T is performed during step 7, whereby the register wheel of order VII is brought from its 9-position into its 0-position wherein it remains up to the end of the return stroke of the register. As indicated in Fig. 40, a tens-transfer is prepared between the steps 6 and 7 in order VIII as indicated by the letter P, when the register wheel of order VII passes from its 9-position into its 0-position.

*Orders VII and IX.*—The chain transfer T is continued in orders VIII and IX as described above in connection with order VII during the return stroke of the register, so that the register wheel of order VIII is advanced from its 9-position into its 0-position and the register wheel of order IX is advanced from its 0-position into into its 1-position.

Therefore, when, after a second axial displacement in the opposite direction through the distance b the register reaches its end position below the register window, the number 100008394 may be read off in the register window which is the answer to the problem of addition shown in Fig. 39.

At the start of the explanation of an addition, it has been assumed that the number 099987654 was the result of a previous calculation. If a plain problem of addition, for example, the addition 14+35 shall be carried out, at first the register is zeroized, whereupon the addend 14 set in the keyboard is added to the number 000000000 in the register by the performance of an adding operation in the manner described above. At the end of such an adding operation the number 000000014 appears in the register window, in other words, the addend 14 has been entered into the register. Thereupon, the setting mechanism is cleared by means of the handle 412 (see Fig. 7), whereupon the second addend 35 is set in the keyboard and added by an adding operation as described above to the first addend 14 in the register.

b. A subtraction

Assume that the number 6931 shall be subtracted from the number 100087654 in such a manner that the setting mechanism 400 is in the second place, i. e. that the order I' of the setting mechanism is associated with the order II of the register as shown in Fig. 41. Such a problem of subtraction would be written in the manner shown in Fig. 42.

Assume further that the number 100087654 is the result of some calculation carried out previously so that the number 100087654 appears in the register window as being entered through the register. This number is also shown in the chart of Fig. 43 as the number appearing in the register window at the start of the calculation.

For the performance of the subtraction, the plus-minus adjusting element 440 is shifted into the second place in the same manner as described above in connection with Fig. 28. However, the frame 402 of the setting mechanism 400 is brought into its "minus"-position, wherein the frame 402 abuts against the minus stop 444 of the plus-minus adjusting element 440.

Now the number 6931 is set in the keyboard by depressing the 1-digit-key of order I', the 3-digit-key of order II', the 9-digit-key of order III' and the 6-digit-key of order IV' as indicated in Fig. 41. Such a depressing of the 1-digit-key of order I' brings its actuating lug 426 out of the path G of the register wheel 218 of order II while the actuating lugs 426 of the 2-digit-key, 3-digit-key . . . 9-digit-key and the actuating pin 430 of order I' remain in the path G of the register pins of the register wheel of order II. Furthermore, the actuating lugs of the 1-digit-key, 2-digit-key, and 3-digit-key of order II' are brought out of the path G of the register pins of the register wheel of order III while the actuating lugs of the 4-digit-key, 5-digit-key . . . 9-digit-key of order II' remain in the path of the register pins of the register wheels of order III. In order III' the actuating lugs of all keys have been brought out of the path G of the register pins of the register wheel of order IV. In order IV' the actuating lugs of the 1-digit-key, 2-digit-key . . . 6-digit-key are out of the path G of the register pins of the register wheel of order V while the actuating lugs of the 7-digit-key, 8-digit-key and 9-digit-key are in the path G of the register pins of the register wheel of order V. In order V', the actuating lugs of all keys are in the path G of the register pins of the register wheel of order VI. Furthermore, the actuating teeth 438 of 3 of the supplementing racks 434 are in the path of the register pins of the register wheels of orders VII, VIII and IX. The actuating teeth of the extreme left-hand supplementing rack 434 are out of the path of register pins of a register wheel, as the setting mechanism 400 has been shifted into the second place. For the reasons outlined above, the setting of the number 6931 sets at the same time the complementary value thereof 999993069, so that the subtraction may be carried out by an addition of the complementary value.

Now considering the variations in the position of the register wheels of order I, II . . . IX in connection with the chart shown in Fig. 43 during a forward stroke of the register in the direction of the arrow A:

*Order I.*—The register wheel of order I remains in its 4-position from the starting position (indicated by Start in Fig. 43) up to the intermediate position (indicated by Interm.) at the end of the forward stroke of the register as said register wheel does not come into engagement with any actuating lug of the setting mechanism.

*Order II.*—The actuating lug of the 1-digit-key of order I' being out of the path of the register wheel of order II does not cause an advance thereof, so that when the register wheel passes below the 1-digit-key during step 1, it remains in its 5-position. Thereafter, the register wheel of order II is 9 times advanced by the actuating lugs of the 2-digit-key, 3-digit-key . . . 9-digit-key and by the actuating pin 430 of order I', so that in the intermediate position of the register at the end of the forward stroke thereof, the register wheel of order II is in its 4-position. During its transit from the 9-position to the 0-position a tens-transfer has been prepared in order III as described above. Said preparation of the tens-transfer is indicated by the letter P.

*Order III.*—During the forward stroke of the register, the register pins of the register wheel miss the actuating lugs of the 1-digit-key, 2-digit-key and 3-digit-key so that at the beginning of the forward stroke the register wheel remains in its 6-position. Thereafter, the register wheel of the order III is advanced 6 times and assumes the 2-position. During its advance from the 9- to 0-position a tens-transfer P has been prepared in order IV.

*Order IV.*—During the forward stroke of the register, the register wheel of order IV remains in its 7-position.

*Order V.*—During the forward stroke of the register, at the beginning the register wheel remains in its 8-position and is advanced from said 8-position into the 1-position when its register pins come into engagement with the actuating lugs of the 7-digit-key, 8-digit-key and 9-digit-key. During its transit from the 9-position to the 0-position, a tens-transfer P is prepared in order VI.

*Orders VI–VIII.*—The register wheels of said orders are advanced 9 times during the forward stroke of the register, as they come into engagement with the actuating lugs and actuating teeth respectively so that they are advanced from their 0-position into their 9-position.

*Order IX.*—The register wheel of order IX actuated by the 9 actuating teeth of a supplementing rack is advanced 9 times during the forward stroke of the register so that it is advanced from its 1-position to its 0-position.

Thus, at the end of the forward stroke when the register is in its intermediate position, the number 099917244 appears in the register.

Now considering the variations in the position of the register wheels during the return stroke of the register in the direction B:

The setting mechanism 400 does not actuate the register wheels as they are axially displaced through the distance $b$ as explained above.

*Order I.*—The register wheel of order I remains in its 4-position.

*Order II.*—The register wheel of order II remains in its 4-position.

*Order III.*—The register wheel is advanced from its 2- to its 3-position when the tens-transfer T, prepared during the forward stroke of the register, is carried out.

*Order IV.*—The register wheel of order IV is advanced from its 7-position to its 8-position when the tens-transfer T, prepared during the forward stroke of the register, is carried out.

*Order V.*—The register wheel remains in its 1-position.

*Order VI.*—The register wheel of order VI is rotated from its 9-position to its 0-position when the tens-transfer prepared during the forward stroke of the register is carried out. At the same time, a tens-transfer P is prepared in order VII.

*Order VII.*—The register wheel is advanced from its 9-position into its 0-position when the tens-transfer T prepared during the return stroke of the register is carried out. At the same time, a tens-transfer P is prepared in order VIII.

*Order VIII.*—The register wheel of order VIII is advanced from its 9-position into its 0-position when the tens-transfer T prepared during the return stroke of the register is carried out. At the same time, a tens-transfer P is prepared in order IX.

*Order IX.*—The register wheel of order IX is advanced from its 0-position into its 1-position when the tens-transfer T prepared during the return stroke of the register is carried out.

Thus, when the register is in its end position below the register window after the end of the return stroke in the direction B the number 100018344 may be read off, which is the answer to the problem of subtraction shown in Fig. 42.

After the calculation has been carried out, the setting mechanism 400 may be cleared by a reciprocating movement of the handle 412 (see Fig. 7) and the register may be cleared by a rotation of the resetting knob 210 through 360°.

c. A multiplication

Assume the answer to the problem 46 × 12 shall be found.

Furthermore, assume the register 200 and the counter 300 are zeroized.

At first, the plus-minus adjusting element 440 is shifted into the first place (as shown in Fig. 2), then the frame 402 of the setting mechanism 400 is brought into the "plus"-position and the counter actuator 330 is brought into the "multiplication"-position as shown in Fig. 24.

Now the number 46 is set in order II′ and I′ of the keyboard.

The register is reciprocated twice in the directions A and B until the counter indicates the number 00002. Now the register indicates 000000092.

At this time, neither the keyboard nor the register nor the counter are cleared.

Now the plus-minus adjusting element 440 is shifted into the second place as shown in Fig. 38, the frame 402 of the setting mechanism 400 remains in its "plus"-position and the counter actuator 330 remains in its "multiplication"-position.

Now the register is reciprocated once, until the counter indicates the number 00012. Now the answer 000000552 to the problem may be read off in the register window.

d. A division

Assume, the answer to the problem 552÷46 shall be found.

Furthermore, assume the register 200 and the counter 300 are zeroized.

The plus-minus adjusting element 440 is shifted into the highest place, i. e. the 5th place in the embodiment shown in the drawings, wherein the spring 446 is in engagement with the extreme left-hand notch 448.

The frame 402 of the setting mechanism 400 is brought into the "plus"-position.

Now the number 552 is set in orders V′, IV′ and III′ of the keyboard, whereupon said number is entered into the register by an addition, so that the register now indicates the number 552000000.

Thereupon, the keyboard and the counter are cleared.

The frame 402 of the setting mechanism 400 is brought into the "minus"-position and the counter actuator 330 is brought into the "division"-position as shown in Fig. 22, whereupon the number 46 is set in order V′ and IV′ of the keyboard.

Thereafter, the number 46 is subtracted once while the plus-minus adjusting element is in the 5th place. After such a subtraction, the number 092000000 appears in the register and the number 10000 appears in the counter.

Thereafter, the plus-minus adjusting element is shifted into the 4th place, whereupon the number 46 set in the keyboard is subtracted twice from the value appearing in the register. Thereafter, the value 000000000 appears in the register and the value 12000 appears in the counter.

As the calculation has been performed in the 5th and the 4th place, the 5th and the 4th order of the counter give the answer to the problem, i. e. the number 12.

14. THE MODIFICATION OF A MECHANISM FOR AN AUTOMATIC CLEARING OF THE SETTING MECHANISM

A mechanism for an automatic clearing of the setting mechanism 400 is illustrated by Figs. 26–32.

The calculating machine fragmentarily shown in said figures comprises the same principal parts as the calculating machine described above. The carriage 116 carrying the register and counter (both not shown in Figs. 26 and 27) may be reciprocated in the directions A and B on the track 102. The setting mechanism 400 including the frame 402 carrying the keys 404 and the plus-minus adjusting element 440 may be displaced along the cross bars 152′ and 154′ in the manner described above. The cross bar 154′ is rigidly secured to the casing 100 by means of nuts 164 in the same manner as the cross bar 154 of Fig. 2 is secured to the casing 100. However, according to Fig. 26, a bushing 166 is arranged on the cross bar 154′ for limiting the extreme right-hand end position of the plus-minus adjusting element 440. According to the embodiment shown in Figs.

26-32, the cross bar 152' is flattened at the top for a purpose to be described hereinafter. Furthermore, the cross bar 152' is rotatably but axially immovably mounted on the casing 100' by means of set collars 168.

An automatic clearing actuator generally indicated by 602 is slidably arranged on the cross bar 152' between the frame 402 of the setting mechanism and a stop 604 secured to the cross bar 152'. As best shown in Figs. 29 and 30 said automatic clearing actuator 602 comprises a member 606 having a handle 608 and a cylindrical portion 610. A plate 612 having a downward extending finger 614 is rotatably arranged on the cylindrical portion 610 of the member 606. The plate 612 held in its position by means of a collar 616 secured to the cylindrical portion 610 of the member 606 is normally urged against a stop 618 secured to the member 606 by means of a spring 620, one end of which is secured to the member 606 and the other end of which rests on said rotatable plate 612. The member 606 has a bore 622 with a cross section corresponding to the cross section of the flattened shaft 152', so that the member 606 of the clearing actuator 602 cannot be rotated relative to the cross-bar 152', and that, on the other hand, the cross-bar 152' is positively coupled with said member 606 for a simultaneous rotation with the latter when such a rotation occurs. The member 606 of the automatic clearing actuator 602 and, of course, the plate 612 held thereon by means of the collar 616 may be displaced from its active position shown in Figs. 26, 27 and 29–32, wherein it abuts against the frame 402 of the setting mechanism 400, to the right into an inactive position, wherein it abuts against the stop 604.

As best shown in Figs. 26–28, an arm 624 is arranged on the cross-bar 152' at the side of the frame 402 opposite to the side facing the automatic clearing actuator 602. One end of a hook-like connecting element 626 is pivotally connected with the free end of the arm 624, the other end of said hook-like connecting element 626 is pivotally connected with the free end of an arm 628 secured to the projecting end of the rod 406, carrying the keys 404 of the highest order of the setting mechanism 400. Said rod 406' is coupled with the rods 406 of the remaining orders of the keyboard by means of the connecting bar 418 as described above. A spring 420 stretched between said connecting rod 618 and a stationary point 422 of the frame 402 tends to hold the rods 406, 406' and the coupling elements 624, 626, 628 and the member 606 of the automatic clearing actuator 602 in the position shown in Figs. 26–31.

As best shown in Figs. 26, 27 and 30–32 an actuating member 630 having a projecting lug 632 is rigidly secured to the frame of the carriage 116. When the automatic clearing actuator 602 is in the position shown in the drawings, the downward projecting finger 614 of said actuator is in the path of the projecting lug 632 of the actuating member 630 mounted on the carriage 116.

When the carriage 116 carrying the register is on its forward stroke in the direction of the arrow A (see Fig. 30) the projecting arm 632 will swing the plate 612 around the cylindrical portion of the member 606 against the action of the spring 620 into the position shown in Fig. 31, as soon as said projecting arm 632 hits the finger 614. During the swinging of the plate 612 into the position shown in Fig. 31, the cross-bar 152' remains in its position.

When the carriage 116 continues its forward stroke in the direction of the arrow A so as to complete the forward stroke, the downward projecting finger 614 will be disengaged from the projecting lug 632 of the actuating member 630, so that the plate 612 carrying said finger 614 will be returned by the spring 620 into its normal position shown in Fig. 30, wherein the plate abuts against the stop 618 secured to the member 606 of the automatic clearing actuator.

Now, when the carriage 116 performs its return stroke in the direction of the arrow B (see Fig. 32) the projecting lug 632 hits again the downward projecting finger 614 of the plate 612. Under these circumstances, however, the plate 612 abutting against the stop 618 of the member 606 causes the latter to rotate in the direction of the arrow L. This rotation, in turn, causes a similar rotation of the cross-bar 152' coupled with the member 606, so that the arm 628 coupled with the cross bar 152' through the coupling elements 626 and 624 is lifted in the direction of the arrow M (see Figs. 27 and 28). Said lifting of the arm 628, in turn, causes a rotation of the rod 406' likewise in the direction of the arrow M, whereby the rods 406 coupled with said rod 406' through the connecting bar 418 are also rotated for a clearing of the setting mechanism 400 in the manner described above.

When the projecting lug 632 of the actuating member 630 is past the projecting finger 614 during the continuation of the return stroke of the carriage 116 in the direction of the arrow B, the spring 420 acting on the connecting bar 418 returns all rods 406, 406' as well as the coupling members 624—628, the cross bar 152' and the automatic clearing actuator 602 into its original position shown in Figs. 26-30, whereby the clearing of the setting mechanism 400 is completed as described above.

Such an automatic clearing of the setting mechanism shall take place only during an addition or subtraction. In case of a multiplication or division, such an automatic clearing of the setting mechanism shall not take place. Therefore, in case of a multiplication or division, the operator of the machine shifts the automatic clearing actuator 602 by means of the handle 608 to the right into its inactive position, until it abuts against the stop 604. Under these circumstances, the finger 614 is out of the path of the projecting lug 632 of the actuating member 630 during the forward and return stroke of the carriage 116, so that an automatic clearing of the setting mechanism is avoided. In such a case, the setting mechanism 400 is manually cleared by means of the handle 412 connected with the rod 406 of the first order in the manner described above.

15. A MODIFIED MECHANISM FOR ACTUATING A COUNTER

According to the embodiment of a calculating machine shown in Figs. 33–37. The carriage 116" reciprocably arranged in the casing 100" of the machine comprises only the register 200, which may be of the type described above in connection with Fig. 2. The counter generally indicated by 700, however, is stationarily arranged in the casing 100". The construction of the setting mechanism 400 comprising the frame 402 carrying the keys 404 and the plus-minus adjusting element 440 corresponds to the construction of the setting mechanism described above in connection with Fig. 2. The frame 402 of the setting mechanism 400 and the plus-minus adjusting element 440 are shiftably arranged on the cross-bars 152 and 154 secured to the casing 100".

The counter 700 comprises a counter shaft 702 rotatably arranged in suitable bearings of the casing 100". Said counter shaft 702 is prevented from axial displacement by means of set collars 704. A spring 706 secured to the casing 100" and engaged with a recess 708 of the counter shaft 702 tends to hold normally the counter shaft 702 in the position shown in Figs. 33–37.

A set of 5 counter wheels 710 is frictionally coupled with the counter shaft 702 in the same manner as described above in connection with the counter wheels 218 of the embodiment shown in Figs. 2 and 3. The set of 5 counter wheels 710 is prevented from axial displacement relative to the counter shaft 702 by set collars 712 secured to the counter shaft 702.

The counter wheels 710 are of equal width and diameter. Each of said counter wheels 710 is provided with 10 equally spaced counter pins 714, 714'. The 9 counter pins 714 are of equal length, the 10th counter pin 714', however, is somewhat longer than the other counter pins for a purpose to be described hereinafter. The sets of 10 counter pins 714, 714' each of adjacent counter wheels 700 are equally spaced at the distance $a$, said distance $a$, in turn, being equal to the distance $a$ between sets of register pins 228 of adjacent register wheels 218.

Furthermore, each counter wheel 710 is provided with 10 numerals 0, 1, 2, 3 ... 9 on its circumference, said numerals being arranged in an ascending sequence when the counter wheels are rotated in the direction of the arrow N (see Figs. 35 and 36). Each of said numerals is placed in a space between two counter pins as shown in Figs. 33 and 34.

The counter actuator for advancing a counter wheel 1 step equal to $\frac{1}{10}$ of one revolution during a reciprocation of the carriage 116" comprises a bar 716 of square cross-section rotatably and axially immovably arranged in the casing 100". A plate 718 of substantially triangular shape is rigidly secured to said square bar 716. A spring 720 stretched between said triangular plate and a stationary point 722 of the casing 100" tends to hold the plate 718 and the square bar 716 in its normal intermediate position shown in Figs. 33 and 35. The plate 718 is in the path of an actuating member 724 secured to the carriage 116".

Furthermore, a stationary spherical member 726 embraced by arms 728 of a bracket 730 secured to the shiftable frame 402 of the setting mechanism 400 is shiftably arranged on said square bar 716. Owing to the square shape of the bar 716 and of the aperture of the spherical member 726 receiving said bar 716, the spherical member 726 cannot be rotated relative to the bar 716. An actuating member generally indicated by 732 is swingably mounted on pivots 734 of the spherical member 726. The actuating member 732 may be held in its extreme positions by means of a spring-loaded locking element 736 (see Fig. 34) arranged for engagement with a recess 738 or a recess 740.

The actuating member 732 has an upper arm 742 and a lower arm 744. A pawl 746 swingably mounted on a pin 748 of the upper arm 742 is normally held in the position shown in Fig. 36 by means of a spring 750 urging its lug 752 against a stop 754 arranged on the upper arm 742. Likewise, a pawl 756 swingably mounted on the lower arm 744 at 758 is normally held in the position shown in Fig. 37 by means of a spring 760 urging its lug 762 against the stop 764 of the lower arm 744.

In the position shown in Fig. 34, the pawl 756 of the lower arm 744 is in alignment with the counter pins 714 of the counter wheel 710 of the first order. When the actuating member 732 is swung in clockwise direction about the pivot 734 by means of a handle 766 arranged at the upper arm 742, until it reaches its other extreme position wherein the locking element 736 is in engagement with the recess 740, the pawl 746 of the upper arm 742 will be displaced through the distance $f$ whereby it comes in line with the counter pins 714 of the counter wheel 710 of the first order. At the same time, of course, the pawl 756 of the lower arm 744 has been displaced to the left through the same distance $f$ out of alignment with the counter pins 714 of the counter wheel 710 of the first order. Said distance $f$ is equal to the distance $f$ (see Fig. 33) through which the frame 402 of the setting mechanism 400 is displaced relative to the plus-minus adjusting element for bringing the frame 402 either into its "plus"- or "minus"-position as described above.

When the actuating member 732 is in the position shown in Figs. 34–37 with the lower pawl 756 in alignment with the counter pins 714 of the counter wheel 710 of the first order, and when the actuating element 724 attached to the carriage 116" comes into engagement with the triangular plate 718 during the forward stroke of the carriage 116" in the direction of the arrow A, the triangular plate 718 will be swung in counter-clockwise direction into the position shown in Fig. 36. This causes the advance of the counter wheel 710 through one step equal to $\frac{1}{10}$ of one revolution by means of the lower pawl 756, coming in mesh with a counter pin 714 of the counter wheel 710. Thus, the counter wheel 710 is rotated in the direction of the arrow N, so that the next higher numeral appears in the counter window 768 (see Fig. 35); in other words, the value 1 has been added to the value previously entered into the counter wheel.

Upon a continuation of the forward stroke of the carriage 116" in the direction of the arrow A, the point of the actuating element 724 becomes disengaged from the point of the triangular plate 718, so that the latter together with the square bar 716 and the pawl 756 are returned into their normal position shown in Fig. 35.

Now, when during the return stroke of the carriage 116" in the direction of the arrow B the actuating element 724 swings the triangular plate 718 in clockwise direction into the position shown in Fig. 37, the pawl 746 of the upper lever 742 is advanced but it cannot cause a rotation of the counter wheel 710, as it is out of alignment with the counter pins 714 through the distance $f$ as shown in Fig. 34.

Upon a continuation of the return stroke of the carriage 116" in the direction of the arrow B, the actuating element 724 becomes disengaged from the triangular plate 718 whereby the latter and the square bar 716 and the pawls 746 and 756 are returned into their normal position shown in Fig. 35.

Now suppose, that the actuating member 732 is swung into its right-hand end position wherein the upper pawl 746 is displaced through the distance $f$ into alignment with the counter pins 714 of the counter wheel 710 of the first order and wherein the lower pawl 756 is displaced through the distance $f$ out of alignment with said counter pins 714. Under such circumstances, as will be readily understood, the lower pawl 756 advanced during the forward stroke of the carriage 116" finds no counter pin 714 in its path, so that it will not cause a rotation of the counter wheel 710 of the first order. However, the upper pawl 746 advanced during the return stroke of the carriage 116" comes into engagement with a counter pin 714 during the return stroke of the carriage, whereby the counter wheel is rotated $\frac{1}{10}$ of a revolution in the direction of the arrow R (see Fig. 35), so that the next lower numeral appears in the counter window 768; in other words, the value 1 has been subtracted from the value previously entered into the counter wheel.

Now suppose, the frame 402 is displaced through the distance $f$ (see Fig. 33) into its "plus"-position and the actuating member 732 is in its extreme left-hand position shown in Fig. 34. Owing to the displacement of the frame 402 to the right through the distance $f$, the upper pawl 746 of the actuating member 732 following the displacement of the frame 402 by means of the arms 728 of the bracket 730 secured to the frame 402 now is in alignment with the counter pins 714 of the counterwheel 710 of the first order, while the lower pawl 756 is displaced to the right through the distance $f$ out of alignment with the counter pins 714. Consequently, during a forward stroke of the carriage 116" in the direction of the arrow A, the lower pawl 756 does not find a counter pin 714 and causes no rotation of the counter wheel 710. During the return stroke of the carriage 116" in the direction of the arrow B, however, the upper pawl 746 comes in mesh with a counter pin 714 of the counter wheel 710 of the first order and rotates same through 1 step equal to $\frac{1}{10}$ of one revolution in the direction of the arrow R, thus subtracting the value 1 from the value previously entered into the counter wheel as explained above.

Finally suppose, the frame 402 is again displaced through the distance $f$ (see Fig. 33) to the right into its "plus"-position, and further suppose, the actuating member 732 is swung into its extreme right-hand position wherein its locking element 736 is in engagement with the recess 740. Under such circumstances, the upper pawl 746 will be displaced to the right from the counter pins 714 of the counter wheel 710 of the first order through the distance $f$ and the lower pawl 756 will be in alignment with the counter pins 714 of the counter wheel 710 of the first order. Consequently, during a forward stroke of the carriage 116" in the direction of the arrow A, the lower pawl 756 will advance the counter wheel 710 of the first order through one step equal to $\frac{1}{10}$ of one revolution, so that the value 1 has been added to the value previously entered into the counter wheel as explained above. During the return stroke of the carriage, the upper pawl 746 will not cause a rotation of the counter wheel 710 as it is out of alignment with the counter pins 714.

Thus, it becomes obvious that the adjustment of the frame 402 into its "minus"-position and the adjustment of the actuating member 732 in its extreme left-hand position as shown in Figs. 33–37 represents the adjustment of the machine for the performance of division. This adjustment of the machine corresponds to the adjustment of the other embodiment of an actuating device for a counter according to the invention described above in connection with Fig. 22. Furthermore, when the frame 402 of the setting mechanism 400 is displaced to the right through the distance $f$ (see Fig. 33) into its "plus"-position, the machine is set in the same way as described above in connection with Fig. 23 relating to said other embodiment of an actuating device for a counter. Moreover, if again the frame 402 is displaced through the distance $f$ (see Fig. 33) into its "plus"-position, when, however, the actuating member 732 is in its extreme right-hand position wherein its locking element 736 is in engagement with the recess 740 (see Fig. 34) the machine is set for a multiplication in the same manner as explained above in connection with Fig. 24 relating to the different embodiment of a counter drive. Furthermore, if the frame 402 is set in its "minus"-position as shown in Fig. 33, if, however, the actuating member 732 is in its extreme right-hand position wherein its locking element 736 is in engagement with the recess 740, the machine is set in the same manner as explained above in connection with Fig. 25 relating to the other embodiment of an actuating mechanism for the counter.

For convenience, "×" and "÷" signs may be applied to a plate 770 in the neighborhood of the extreme right-hand position of the handle 766 and the extreme left-hand position of said handle 766 respectively as shown in Fig. 33 so as to indicate the "multiplication"-position and the "division"-position respectively of the actuating member 732.

As becomes apparent from above, the actuating member 732 may be adjusted relative to the counter wheel 710 in a "plus"- and "minus"-position. Furthermore, in each of said positions it may be adjusted in a "multiplication"- and a "division"-position.

In the position shown in Fig. 33, the spring 446 of the plus-minus adjusting element 440 is engaged with the notch 448 of the first place. If the plus-minus adjusting element is shifted for engagement of its spring 446 with a notch 448 of another place, the actuating member 732 will cooperate with a counter wheel 710 of a corresponding different order in the same manner as described above in connection with the counter wheel 710 of the first order, as the counter pins 714 are spaced from each other at the same distance $a$ as the notches 448 are spaced from each other.

As mentioned above, the pin 714' of each counter wheel 710 is somewhat longer than the other counter pins 714. When the counter wheels are in their 0-position as shown in Figs. 33 and 35, said long counter pin 714' rests on a stopping element 772 secured to the casing 100". Furthermore, the counter shaft 702 is provided with a resetting knob 774 secured to the projecting end thereof. In order to reset or zeroize the counter wheels after the performance of a calculation, the resetting knob 774 is manually rotated through one revolution in the direction of the arrow R (see Fig. 35). During such a resetting operation, the counter wheels being in a 0-position will remain in their 0-position as their long pins 714' abut against said stopping element 772. The counter wheels being in another position than the 0-position will be rotated together with the resetting knob 774 until their long pin 714' abuts against said stopping plate 772. Thus, after a full rotation of the resetting knob 774, all counter wheels will be in their 0-position; in other words, the counter has been zeroized.

16. SUMMARY

The drawings illustrate an embodiment of a calculating machine according to the invention, wherein, during a calculation, the setting mechanism is stationary and the register is reciprocated. If desired, however, the calculating machine could be designed in such a way, that, during a calculation, the setting mechanism is reciprocated and the register is stationary.

Furthermore, the mechanism for adjusting the machine for addition or subtraction and/or the mechanism for place-shifting could be associated with the register instead of with the setting mechanism so as to render possible the relative displacements between the register and the setting mechanism for such adjustments.

Moreover, according to the embodiments shown in the drawings, the counter actuator is coupled with the setting mechanism for its adjustments relative to a counter wheel in the "plus"- and "minus"-positions; if desired, however, the counter could also be displaced relative to the counter-actuator for such adjustments.

Generally speaking, there are many possibilities for obtaining the various relative movements between various operative parts of a calculating machine according to the invention, and the invention is not restricted to the means for obtaining such relative movements as shown in the drawings.

According to the embodiments shown in the drawings, the register may be reciprocated by a manual gripping of the projecting ends of the register shaft. It is understood, however, that any suitable lever-mechanism, key-mechanism or other mechanical drive or electrical drive could be provided and connected with the register for reciprocating same. Owing to the arrangement of the elements of the machine in such a way, that the tens-transfer is prepared during the forward stroke of the register and the performance of the tens-transfer as well as the clearing of the tens-transfer mechanism take place during the return stroke of the register, the stroke of the register in one direction may be made short enough, that the described operation by hand or the above mentioned application of a lever-mechanism becomes practicable. Said reduction of the stroke also renders possible to reduce the length of the machine to a size permitting the carrying of the machine in a coat-pocket.

Furthermore, above described arrangement for a simultaneous setting of several keys and/or several actuating means in one order by the actuation of a selected key, which permits the use of keys of considerably smaller size than the size of a finger tip, contributes to a reduction of the length of the machine.

Moreover, the arrangement of the parts for a relative movement between the register and the setting mechanism in a straight line eliminates the hitherto customary construction of the register in the shape of a drum of considerable diameter requiring such a height of the machine, that customary calculating machines with such a drum-shaped register could not be placed into a coat-pocket. According to the present invention, the height of the machine with a reciprocable register can be readily reduced to a size fitting in coat pockets.

According to the drawings, pin-lug or pin-teeth drives are provided for advancing the register and counter wheels; it is understood, that any other suitable drive could be used for advancing the register wheels and/or counter wheels of the calculating machine according to the invention.

Although preferably the individual objects of the invention, for example, the register, the keyboard, the actuator, the counter, are applied to a calculating machine in the combination described, the individual objects of the invention may be applied individually or in partial combination to calculating machines. It is emphasized that the merits of the invention are not limited to the described and illustrated combination, but the individual objects of the invention per se also have inventive merits.

I have described preferred embodiments of my invention, but it is understood that this disclosure is for the purpose of illustration, and that various omissions and changes in shape, proportion and arrangement of parts, as well as the substitution for equivalent elements for the arrangement shown and described may be made without departing from the spirit and scope of the invention as set forth in the appended claims.

What I claim is:

1. A calculating machine comprising: a multi-order actuator including a plurality of actuator racks, a multi-order register including a plurality of toothed register elements, said actuator and said register being reciprocable relative to each other, said actuator racks comprising an ordinal complement of individual toothed elements adjustable from a normal ineffective position to an effective position for alignment with said toothed register elements for operative meshing engagement during relative reciprocation of said register and actuator, setting means including a multi-order key-board, a row of movable digit keys in each order of said key-board, one key for each toothed actuator element, said setting means being operatively connected with said toothed actuator elements to adjust a selected number of said elements, equal to the digit value of the key depressed, to effective position, means for reciprocating said register and actuator relative to each other, said setting means including a support, a plurality of parallel rods rotatably arranged in said support, said rods being positively coupled with each other, each row of said digit-keys being frictionally mounted on one of said rods and being arranged for swinging movements about the axis of the associated rod, each toothed actuator element being rigidly connected with such a swingable digit-key, abutting means associated with each swingable digit key for limiting its swinging movement from a normal position into an actuated position, a clearing element secured to one of said rods, a first stop and a second stop mounted on said support for co-operation with said clearing element so as to limit a rocking movement thereof, and resilient means associated with said clearing element for normally holding same against said first stop.

2. A calculating machine comprising: a multi-order actuator including a plurality of actuator racks, a multi-order register including a plurality of toothed register elements, said actuator and said register being reciprocable relative to each other, said actuator racks comprising an ordinal complement of individual toothed elements adjustable from a normal first mutually aligned position to a second mutually aligned position for operative meshing engagement selectively with said toothed register elements in one of said two positions during relative reciprocation of said register and actuator, setting means including a multi-order keyboard, a row of movable digit keys in each order of said keyboard, one key for each toothed actuator element, said setting means being operatively connected with said toothed actuator elements to adjust a selected number of said elements, equal to the digit value of the key depressed, to said second position, the toothed actuator elements positioned in one of said two positions representing a numerical value and the toothed actuator elements positioned in the other position representing the complement of such a numerical value, plus-minus adjusting means for selectively changing the relative position between the actuator racks and the register elements so as to place the toothed actuator elements being in said first position or the toothed actuator elements being in said second position in a position capable of cooperation with said toothed register elements, and means for reciprocating said actuator and said register relative to each other whereby the value set in the toothed actuator elements being in cooperative relation to register elements may be entered into the register.

3. In a calculating machine as claimed in claim 2, nine settable toothed actuator elements in each actuator rack with settable toothed actuator elements, and an additional fixed tenth actuator element in the lowest order of said actuator, said additional tenth actuator element being positioned in series with toothed actuator elements of the lowest order positioned for representing the complementary value.

4. In a calculating machine as claimed in claim 2, the number of actuator racks having settable toothed actuator elements being smaller than the number of register elements in the register, and at least one supplementary actuator rack in said actuator, said supplementary actuator rack comprising on ordinal complement of fixed teeth and said supplementary actuator racks increasing the number of orders of a complement of a numerical value set in the actuator to at least the number of register elements of the register.

5. In a calculating machine as claimed in claim 2, the number of actuator racks having settable toothed actuator elements being smaller than the number of register elements in the register, nine settable toothed actuator elements in each actuator rack with settable toothed actuator elements, an additional fixed tenth actuator element in the lowest order of said actuator, said additional tenth actuator element being positioned in series with toothed actuator elements of the lowest order positioned for representing the complementary value, and at least one supplementary actuating rack in said actuator, said supplementary actuator rack comprising nine fixed teeth, and said supplementary actuator racks increasing the number of orders of a complement of a numerical value set in the actuator to at least the number of register elements of the register.

6. In a calculating machine as claimed in claim 2, a support carrying said actuator, said support being displaceable in a direction parallel to the longitudinal axis of the register, and said plus-minus adjusting means being arranged for cooperation with said support so as to limit its extreme plus-position wherein the toothed actuator elements positioned in the position for representing a numerical value are capable of cooperation with said register elements and its extreme minus-position wherein the toothed actuator elements positioned in the position for representing the complement of the numerical value are capable of cooperation with said register elements.

7. In a calculating machine as claimed in claim 2, a support carrying said actuator, said support being displaceable in a direction parallel to the longitudinal axis of the register, said plus-minus adjusting means being arranged for cooperation with said support so as to limit its extreme plus-position wherein the toothed actuator elements positioned in the position for representing a numerical value are capable of cooperation with said register elements and its extreme minus-position wherein the toothed actuator elements positioned in the position for representing the complement of the numerical value are capable of cooperation with said register elements, and said plus-minus adjusting means being adjustable for selectively shifting the place of the support carrying the actuator relative to the register so as to bring different orders of the actuator and the register in cooperaive relation to each other.

8. In a calculating machine as claimed in claim 2, a multi-order counter including a plurality of counter elements movable thereon in a first direction and in a second opposite direction, and adjustable counter actuating means responsive to a relative movement between the actuator and the register for actuating a counter element, said plus-minus adjusting means being associated with said counter actuating means for adjusting same relative to the counter in a "plus"-position or "minus"-position, said counter actuating means being also selectively adjustable in each of said "plus"- and "minus"-positions in a "multiplication"-position or a "division"-position in operative relation to a counter element, a first part of said counter actuating means being in position for advancing a counter element in said first direction when the counter actuating means is adjusted in a "plus"-position and "multiplication"-position or in a "minus"-position and "division"-position, and a second part of said counter actuating means being in position for advancing a counter element in said second opposite direction when the counter actuating means is adjusted in a "plus"-position and "division"-position or in a "minus"-position and "multiplication"-position.

9. In a calculating machine as claimed in claim 2, means for selectively shifting the place of the actuator and the register relative to each other so as to bring different orders of the actuator and the register in cooperative relation to each other.

10. In a calculating machine as claimed in claim 2, said toothed actuator elements set for operative meshing engagement and said register elements being in a first position relative to each other during the greater part of a forward stroke in one direction for the performance of an actuating movement, said set toothed actuator elements and said register elements being in a second relatively disengaged position during the greater part of a return stroke in opposite direction, means responsive to a movement of the relatively movable actuator and register for effecting said first relative position of said set toothed actuator elements and register elements at a predetermined interval during said forward stroke and for effecting said second relative position of said set toothed actuator elements and register elements at a predetermined interval during said return stroke, and a tens transfer mechanism arranged for operative engagement with register elements of the register during said return stroke, whereby the numerical value set in the actuating means is entered into the register during said forward stroke and tens transfer may be performed during said return stroke.

11. A calculating machine comprising: a multi-order actuator including a plurality of actuator racks, a multi-order register including a plurality of toothed register elements, said actuator and said register being reciprocable parallel to each other in a substantially straight line motion, said actuator racks comprising an ordinal complement of individual toothed elements adjustable from a normal first mutually aligned position to a second mutually aligned position for operative meshing engagement selectively with said toothed register elements in one of said two positions during relative reciprocation of said register and actuator, setting means including a multi-order keyboard, a row of movable digit keys in each order of said keyboard, one key for each toothed actuator element, said setting means being operatively connected with said toothed actuator elements to adjust a selected number of said elements, equal to the digit value of the key depressed, to said second position, the toothed actuator elements positioned in one of said two positions representing a numerical value and the toothed actuator elements positioned in the other position representing the complement of such a numerical value, plus-minus adjusting means for selectively changing the relative position between the actuator racks and the register elements so as to place the toothed actuator elements being in said first position or the toothed actuator elements being said second position in a position capable of cooperation with said toothed register elements, and means for reciprocating said actuator and said register relative to each other whereby the value set in the toothed actuator elements being in cooperative relation to register elements may be entered into the register.

12. A calculating machine comprising: a multi-order actuator including a plurality of actuator racks, a multi-order register including a plurality of toothed register elements, said actuator and said register being reciprocable parallel to each other in a substantially straight line motion, said actuator racks comprising an ordinal complement of individual toothed elements adjustable from a normal ineffective position to an effective position for operative meshing engagement selectively with said toothed register elements during relative reciprocation of said register and said actuator, setting means including a multi-order keyboard, a row of movable digit keys in each order or said keyboard, one key for each toothed actuator element, said setting means being operatively connected with said toothed actuator elements, to adjust a selected number of said elements, equal to the digit value of the key depressed, to effective position, means for reciprocating said register and actuator elements relative to each other, said toothed actuator elements set for meshing engagement and said register elements being in a first position relative to each other during the greater part of a forward stroke in one direction for the performance of an actuating movement, said set toothed actuator elements and said register elements being in a second relatively disengaged position during the greater part of a return stroke in opposite direction, means responsive to a movement of the relatively movable actuator and register for effecting said first relative position of said set toothed actuator elements and register elements at a predetermined interval during said forward stroke and for effecting said second relative position of said set toothed actuator elements and register elements at a predetermined interval during said return stroke, a series of settable tens transfer performers arranged for cooperation with register elements of the register, said series of settable tens transfer performers being in the same relationship to said register as said actuator, said series of settable tens transfer performers being in an inactive position disengaged from said register elements during said forward stroke, and a series of movable tens transfer preparers, each of said tens transfer preparers being associated with a register element and a tens transfer performer for bringing the latter from said inactive position into an active position upon a movement of the associated register element from its 9-position into the 0-position, the tens transfer performers set by the tens transfer preparers into active position being arranged for operative engagement with register elements of the register during said return stroke whereby the numerical value set in the toothed actuator elements is entered into the register during said forward stroke and tens transfer may be performed during said return stroke.

13. In a calculating machine as claimed in claim 12, means associated with said tens transfer preparers and said tens transfer performers for returning the latter from their active position into their inactive position in dependence on the reciprocation of the relatively movable actuator and register.

14. A calculating machine comprising: a multi-order actuator including a plurality of actuator racks, a multi-order register including a plurality of toothed register elements, said actuator and said register being movable relative to each other, said actuator racks comprising an ordinal complement of individual toothed elements adjustable from a normal first position to a second position for alignment with said toothed register elements for operative meshing engagement in one of said two positions during relative movement of said register and actuator, setting means including a multi-order keyboard, a row of movable digit keys in each order of said keyboard, one key for each toothed actuator element, said setting means being operatively connected with said toothed actuator elements to adjust a selected number of said element equal to the digit value of the key depressed, to second position, the toothed actuator elements positioned in one of said two positions representing a numerical value and the toothed actuator elements positioned in the other position representing the complement of such a numerical value, plus-minus adjusting means for selectively changing the relative position between the actuator racks and the register elements so as to place the toothed actuator elements being in said first position or the toothed actuator elements being in said second position in a position capable of cooperation with said toothed register elements, and means for moving said actuator and said register relative to each other whereby the value set in the toothed actuator elements being in cooperative relation to register elements may be entered into the register.

15. In a calculating machine as claimed in claim 14, means associated with the settable toothed actuator elements of each actuator rack for setting, in response to the setting of a toothed actuator element of an actuator rack, all settable toothed actuator elements of the latter which adjoin in one direction of said actuator rack the toothed actuator element set by its associated setting means.

16. In a calculating machine as claimed in claim 14, each settable toothed actuator element of the actuator racks being rigidly connected with such a digit-key.

17. In a calculating machine as claimed in claim 14, said setting means including a support, a plurality of parallel rods rotatably arranged in said support, said rods being positively coupled with each other, each row of said digit-keys being frictionally mounted on one of said rods and being arranged for swinging movements about the axis of the associated rod, each settable toothed actuator element being rigidly connected with such a swingable digit-key, abutting means associated with each swingable digit key for limiting its swinging movement from a normal position into an actuated position, a clearing element secured to one of said rods, a first stop and a second stop mounted on said support for cooperation with said clearing element so as to limit a rocking movement thereof, and resilient means associated with said clearing element for normally holding same against said first stop.

18. In a calculating machine as claimed in claim 14, nine settable toothed actuator elements in each actuator rack with settable toothed actuator elements, and an additional fixed tenth actuator element in the lowest order of said actuator, said additional tenth actuator element being positioned in series with toothed actuator elements of the lowest order positioned for representing the complementary value.

19. In a calculating machine as claimed in claim 14, the number of actuator racks having settable toothed actuator elements being smaller than the number of register elements in the register, and at least one supplementary actuator rack in said actuator, said supplementary actuator rack comprising an ordinal complement of fixed teeth, and said supplementary actuator racks increasing the number of orders of a complement of a numerical value set in the actuator to at least the number of register elements of the register.

20. In a calculating machine as claimed in claim 14, the number of actuator racks having settable toothed actuator elements being smaller than the number of register elements in the register, nine settable toothed actuator elements in each actuator rack with settable toothed actuator elements, an additional fixed tenth actuator element in the lowest order of said actuator, said additional tenth actuator element being positioned in series with toothed actuator elements of the lowest order positioned for representing the complementary value, and at least one supplementary actuating rack in said actuator, said supplementary actuating rack comprising nine fixed teeth, and said supplementary actuator racks increasing the number of orders of a complement of a numerical value set in the actuator to at least the number of register elements of the register.

21. In a calculating machine as claimed in claim 14, a support carrying said actuator, said support being displaceable in a direction parallel to the longitudinal axis of the register, and said plus-minus adjusting means being arranged for cooperation with said support so as to limit its extreme plus-position wherein the toothed actuator elements positioned in the position for representing a numerical value are capable of cooperation with said register elements and its extreme minus-position wherein the toothed actuator elements positioned in the position for representing the complement of the numerical value are capable of cooperation with said register elements.

22. In a calculating machine as claimed in claim 14, means for selectively shifting the place of the actuator and the register relative to each other so as to bring different orders of the actuator and the register in cooperative relation to each other.

23. In a calculating machine as claimed in claim 14, a support carrying said actuator, said support being displaceable in a direction parallel to the longitudinal axis of the register, said plus-minus adjusting means being arranged for cooperation with said support so as to limit its extreme plus-minus position wherein the toothed actuator elements positioned in the position for representing a numerical value are capable of cooperation with said register elements and its extreme minus-position wherein the toothed actuator elements positioned in the position for representing the complement of the numerical value are capable of cooperation with said register elements, and said plus-minus adjusting means being adjustable for selectively shifting the place of the support carrying the actuator relative to the register so as to bring different orders of the actuator and the register in cooperative relation to each other.

24. In a calculating machine as claimed in claim 14, means responsive to a relative movement between the actuator and the register for effecting an operative engagement of the actuator and the register during the first portion of a cycle of relative movement between said actuator and register and for preventing an operative engagement of the actuator and register during the second portion of such a cycle, whereby the numerical value set in the tooth-like actuator elements is entered into the register during said first portion of the cycle.

25. In a calculating machine as claimed in claim 14, said toothed actuator elements set for operative meshing engagement and said register elements being in a first position relative to each other during the first portion of a cycle of relative movement between said actuator and said register for causing actuation of said register, said set toothed actuator elements and said register elements being in a second relatively disengaged position during the second portion of said cycle, means responsive to a movement of the relatively movable actuator and register for effecting said first relative position of said set toothed actuator elements and said register elements at a predetermined interval during said first portion of said cycle and for effecting said second relative position of said set toothed actuator elements and said register elements at a predetermined interval during said second portion of said cycle, and a tens transfer mechanism arranged for operative engagement with register elements of the register during said second portion of said cycle, whereby the numerical value set in the toothed actuator elements is entered into the register during said first portion of said cycle and tens transfer may be performed during said second portion of said cycle.

FRITZ ALBERT DEUTSCH.

REFERENCES CITED

The following references are of record in the file of this patent:

UNITED STATES PATENTS

| Number | Name | Date |
| --- | --- | --- |
| 368,528 | Grant | Aug. 16, 1887 |
| 605,288 | Grant | June 7, 1898 |

(Other references on following page)

UNITED STATES PATENTS

| Number | Name | Date |
|---|---|---|
| 773,632 | Ensign | Nov. 1, 1904 |
| 775,939 | Saunders | Nov. 24, 1904 |
| 918,766 | McLeland | Apr. 20, 1909 |
| 966,248 | Shattuck | Aug. 2, 1910 |
| 976,152 | Cloud et al. | Nov. 22, 1910 |
| 1,029,655 | Yadu | June 18, 1912 |
| 1,220,009 | Schaller | Mar. 20, 1917 |
| 1,325,625 | Des Jardins | Dec. 23, 1919 |
| 1,474,137 | Beckenbauer | Nov. 13, 1923 |
| 1,492,442 | Fournier et al. | Apr. 29, 1924 |
| 1,534,938 | Fournier et al. | Apr. 21, 1925 |
| 1,862,901 | Martin | June 14, 1932 |
| 2,004,495 | Sundstrand | June 11, 1935 |
| 2,008,355 | Hellgren | July 16, 1935 |
| 2,042,342 | Kaiser | May 26, 1936 |
| 2,101,766 | Walter | Dec. 7, 1937 |
| 2,248,257 | Thatcher | July 8, 1941 |
| 2,260,291 | Britten | Oct. 28, 1941 |
| 2,273,237 | Walter | Feb. 17, 1942 |
| 2,397,166 | Smith | Mar. 26, 1946 |
| 2,410,823 | Laiho | Nov. 12, 1946 |

FOREIGN PATENTS

| Number | Country | Date |
|---|---|---|
| 410,129 | Great Britain | May 9, 1934 |